US012764324B2

(12) United States Patent
Zhu et al.

(10) Patent No.: US 12,764,324 B2
(45) Date of Patent: *Oct. 13, 2026

(54) BLOCK VECTOR PREDICTION IN VIDEO AND IMAGE CODING/DECODING

(71) Applicant: Microsoft Technology Licensing, LLC, Redmond, WA (US)

(72) Inventors: Lihua Zhu, Mountain View, CA (US); Gary J. Sullivan, Bellevue, WA (US); Jizheng Xu, Beijing (CN); Sridhar Sankuratri, Campbell, CA (US); B. Anil Kumar, Saratoga, CA (US); Feng Wu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/091,624

(22) Filed: Mar. 26, 2025

(65) Prior Publication Data

US 2025/0227287 A1 Jul. 10, 2025

Related U.S. Application Data

(63) Continuation of application No. 18/404,749, filed on Jan. 4, 2024, now Pat. No. 12,413,771, which is a continuation of application No. 17/751,392, filed on May 23, 2022, now Pat. No. 11,910,005, which is a continuation of application No. 16/577,883, filed on Sep. 20, 2019, now Pat. No. 11,388,433, which is a continuation of application No. 15/107,712, filed as application No. PCT/CN2014/070072 on Jan. 3, 2014, now Pat. No. 10,469,863.

(51) Int. Cl.
*H04N 19/52* (2014.01)
*H04N 19/91* (2014.01)

(52) U.S. Cl.
CPC ............ *H04N 19/52* (2014.11); *H04N 19/91* (2014.11)

(58) Field of Classification Search
CPC .. H04N 19/593; H04N 19/105; H04N 19/119; H04N 19/154; H04N 19/176; H04N 19/11
See application file for complete search history.

(56) References Cited

U.S. PATENT DOCUMENTS 6,249,549 B1 6/2001 Kim
7,027,654 B1 4/2006 Ameres et al.
(Continued)

OTHER PUBLICATIONS

Bahari et al., "Low-Power H.264 Video Compression Architectures for Mobile Communication," IEEE Trans. On Circuits and Systems for Video Technology, vol. 19, No. 9, pp. 1251-1261 (Sep. 2009).
(Continued)

*Primary Examiner* — Zaihan Jiang
(74) *Attorney, Agent, or Firm* — Klarquist Sparkman, LLP

(57) ABSTRACT

Innovations in the area of prediction of block vector ("BV") values improve encoding or decoding of blocks using intra block copy ("BC") prediction. For example, some of the innovations relate to use of a default BV predictor with a non-zero value. Other innovations relate to use of a selected one of multiple BV predictor candidates for a current block. Still other innovations relate to use of a skip mode in which a current intra-BC-predicted block uses a predicted BV value.

20 Claims, 16 Drawing Sheets

(56) References Cited

U.S. PATENT DOCUMENTS

| | | | | |
|---|---|---|---|---|
| 9,883,203 | B2 | 1/2018 | Chien et al. | |
| 10,142,654 | B2* | 11/2018 | Peng | H04N 19/105 |
| 10,582,213 | B2 | 3/2020 | Li et al. | |
| 11,109,036 | B2 | 8/2021 | Li et al. | |
| 11,317,113 | B2 | 4/2022 | Li et al. | |
| 12,081,779 | B2 | 9/2024 | Li et al. | |
| 12,244,823 | B2 | 3/2025 | Li et al. | |
| 2005/0185937 | A1 | 8/2005 | Comer et al. | |
| 2009/0010337 | A1* | 1/2009 | Wang | H04N 19/563 375/E7.123 |
| 2011/0194619 | A1 | 8/2011 | Yu et al. | |
| 2012/0114039 | A1* | 5/2012 | Wang | H04N 11/02 375/E7.243 |
| 2013/0016785 | A1* | 1/2013 | Wang | H04N 19/52 375/240.16 |
| 2014/0161186 | A1* | 6/2014 | Zhang | H04N 19/103 375/240.16 |
| 2014/0376634 | A1* | 12/2014 | Guo | H04N 19/523 375/240.16 |
| 2015/0049813 | A1* | 2/2015 | Tabatabai | H04N 19/70 375/240.16 |
| 2015/0189272 | A1* | 7/2015 | Peng | H04N 19/119 375/240.02 |
| 2015/0195559 | A1* | 7/2015 | Chen | H04N 19/11 375/240.16 |
| 2015/0256844 | A1* | 9/2015 | Ikai | H04N 19/36 382/233 |
| 2015/0334405 | A1* | 11/2015 | Rosewarne | H04N 19/463 375/240.02 |
| 2015/0373370 | A1* | 12/2015 | Rapaka | H04N 19/52 375/240.02 |
| 2016/0227244 | A1* | 8/2016 | Rosewarne | H04N 19/70 |
| 2016/0330474 | A1* | 11/2016 | Liu | H04N 19/56 |
| 2017/0155914 | A1* | 6/2017 | Jeon | H04N 19/513 |
| 2024/0380908 | A1 | 11/2024 | Li et al. | |

OTHER PUBLICATIONS

Communication pursuant to Article 94(3) EPC dated Aug. 11, 2025, from European Patent Application No. 21186125.7, 4 pp.

Examiner's Report dated Apr. 17, 2025, from Canadian Patent Application No. 3,171,803, 3 pp.

Intimation of grant dated Oct. 11, 2023, from Indian Patent Application No. 201747008352, 1 p.

Notice of Allowance dated Mar. 26, 2025, from U.S. Appl. No. 18/620,604, 9 pp.

Notice of Allowance dated May 13, 2025, from U.S. Appl. No. 18/404,749, 14 pp.

Office Action dated Jan. 15, 2026, from U.S. Appl. No. 18/783,241, 20 pp.

Budagavi et al., "HEVC ALF Decode Complexity Analysis and Reduction," IEEE Int'l Conf on Image Processing, pp. 733-736 (2011).

Communication pursuant to Article 94(3) EPC dated Apr. 8, 2026, from European Patent Application No. 22182574.8, 8 pp.

Communication under Rule 71(3) EPC dated Mar. 10, 2026, from European Patent Application No. 24159778.0, 7 pp.

Google Search Log cited by U.S. Patent Office in Notice of Allowance for U.S. Appl. No. 19/007,296, 3 pp. (2026).

Norkin et al., "HEVC Deblocking Filtering and Decisions," SPIE Optical Engineering + Applications, 8 pp. (2012).

Notice of Allowance dated Apr. 13, 2026, from U.S. Appl. No. 19/007,296, 9 pp.

Notice of Allowance dated Apr. 15, 2026, from U.S. Appl. No. 19/090,204, 11 pp.

Notice of Allowance dated May 6, 2026, from U.S. Appl. No. 18/783,241, 8 pp.

Office Action dated Mar. 16, 2026, from U.S. Appl. No. 19/028,032, 8 pp.

Office Action dated Mar. 24, 2026, from U.S. Appl. No. 19/090,156, 10 pp.

Office Action dated Mar. 24, 2026, from U.S. Appl. No. 19/090,180, 10 pp.

Office Action dated Mar. 26, 2026, from U.S. Appl. No. 19/093,437, 10 pp.

Office Action dated Mar. 30, 2026, from U.S. Appl. No. 19/092,898, 9 pp.

Office Action dated Mar. 30, 2026, from U.S. Appl. No. 19/090,225, 10 pp.

Office Action dated Apr. 8, 2026, from U.S. Appl. No. 19/092,858, 13 pp.

Office Action dated Apr. 8, 2026, from U.S. Appl. No. 19/092,954, 13 pp.

Office Action dated Apr. 20, 2026, from U.S. Appl. No. 19/092,988, 7 pp.

Office Action dated Apr. 29, 2026, from U.S. Appl. No. 19/089,845, 11 p.

Office Action dated Apr. 29, 2026, from U.S. Appl. No. 19/089,900, 11 pp.

Office Action dated Apr. 29, 2026, from U.S. Appl. No. 19/090,011, 9 pp.

Office Action dated Apr. 30, 2026, from U.S. Appl. No. 19/089,953, 11 pp.

Office Action dated Apr. 30, 2026, from U.S. Appl. No. 19/090,056, 11 pp.

Decision to Grant dated Jul. 23, 2026, from European Patent Application No. 24159778.0, 2 pp.

Final Office Action dated Jul. 15, 2026, from U.S. Appl. No. 19/090,156, 8 pp.

Final Office Action dated Jul. 15, 2026, from U.S. Appl. No. 19/090,180, 8 pp.

Final Office Action dated Jul. 15, 2026, from U.S. Appl. No. 19/090,225, 8 pp.

Notice of Allowance dated May 21, 2026, from Canadian Patent Application No. 3171803, 1 p.

Notice of Allowance dated Jun. 2, 2026, from U.S. Appl. No. 19/091,606, 20 pp.

Notice of Allowance dated Jul. 17, 2026, from U.S. Appl. No. 19/092,988, 10 pp.

Notice of Allowance dated Jul. 21, 2026, from U.S. Appl. No. 19/028,032, 10 pp.

Notice of Allowance dated Jul. 21, 2026, from U.S. Appl. No. 19/092,858, 10 pp.

Notice of Allowance dated Jul. 21, 2026, from U.S. Appl. No. 19/092,898, 9 pp.

Notice of Allowance dated Jul. 21, 2026, from U.S. Appl. No. 19/092,954, 10 pp.

Office Action dated Jun. 3, 2026, from U.S. Appl. No. 19/249,745, 11 pp.

Office Action dated Jun. 17, 2026, from U.S. Appl. No. 19/249,639, 10 pp.

Office Action dated Jun. 17, 2026, from U.S. Appl. No. 19/249,787, 11 pp.

* cited by examiner

201

202

500

BV (761) for current block (760) of current frame (710), indicating a displacement to a matching block (762) in the current frame (710)

BV (751) of previous intra BC predicted block (750) used as BV predictor for BV (761) for current block (760) of current frame (710)

default BV predictor of (0, 0) for BV (761) for current block (760) of current frame (710)

default BV predictor (763) with non-zero horizontal component for BV (761) for current block (760) of current frame (710)

Figure 14

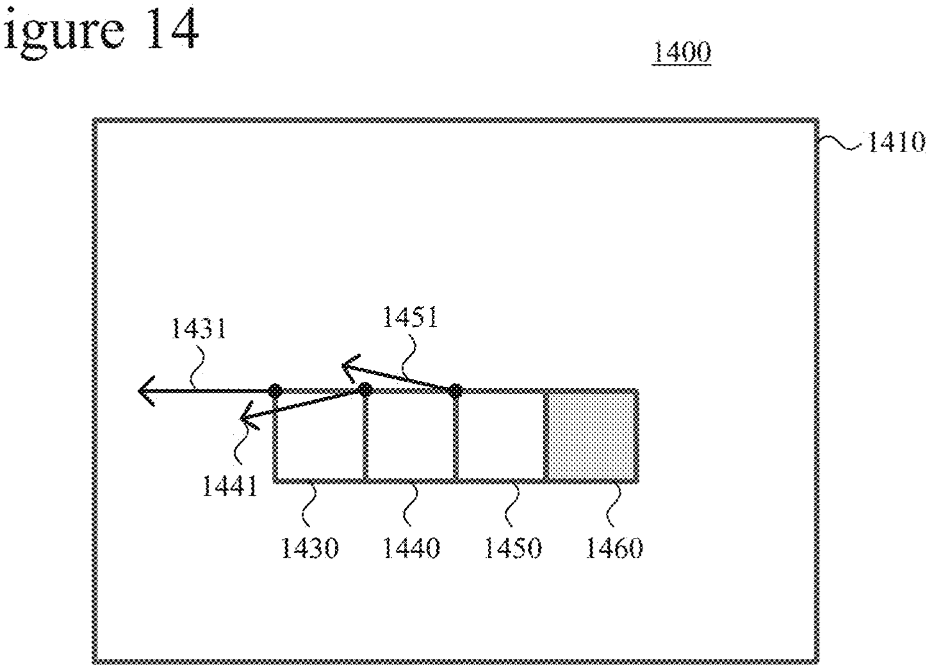

BV predictor candidates from BV values (1431, 1441, 1451) of three previous intra-BC-predicted blocks according to merge mode for BV for current block (1460)

| **merge mode index value:** | block vector (BV) predictor |
|---|---|
| **idx 0 :** | BV (1451) from 1st previous intra-BC-predicted block (1450) |
| **idx 1 :** | BV (1441) from 2nd previous intra-BC-predicted block (1440) |
| **idx 2 :** | BV (1431) from 3rd previous intra-BC-predicted block (1430) |
| **idx 3 :** | default BV predictor with horizontal displacement |
| **idx 4 :** | default BV predictor with vertical displacement |

Figure 15

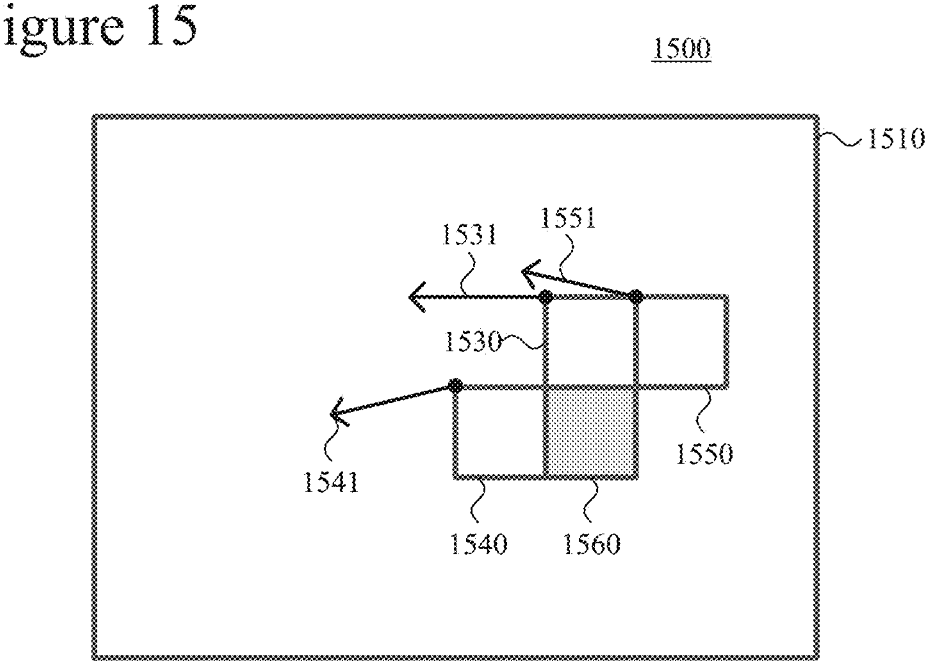

BV predictor candidates from BV values (1531, 1541, 1551) of three neighboring intra-BC-predicted blocks according to merge mode for BV for current block (1560)

| merge mode index value: | block vector (BV) predictor |
|---|---|
| idx 0 : | BV (1541) from 1st neighboring intra-BC-predicted block (1540) |
| idx 1 : | BV (1531) from 2nd neighboring intra-BC-predicted block (1530) |
| idx 2 : | BV (1551) from 3rd neighboring intra-BC-predicted block (1550) |
| idx 3 : | default BV predictor with horizontal displacement |
| idx 4 : | default BV predictor with vertical displacement |

1631 (example of 1630)

BLOCK VECTOR PREDICTION IN VIDEO AND IMAGE CODING/DECODING

CROSS REFERENCE TO RELATED APPLICATIONS

This application is a continuation of U.S. patent application Ser. No. 18/404,749, filed Jan. 4, 2024, which is a continuation of U.S. patent application Ser. No. 17/751,392, filed May 23, 2022, now U.S. Pat. No. 11,910,005, which is a continuation of U.S. patent application Ser. No. 16/577,883, filed Sep. 20, 2019, now U.S. Pat. No. 11,388,433, which is a continuation of U.S. patent application Ser. No. 15/107,712, filed Jun. 23, 2016, now U.S. Pat. No. 10,469,863, which is incorporated by reference herein in its entirety. U.S. patent application Ser. No. 15/107,712 is the U.S. National Stage of International Application No. PCT/CN2014/070072, filed Jan. 3, 2014, which was published in English under PCT Article 21(2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the HEVC standard (ITU-T H.265 or ISO/IEC 23008-2) has been approved. Extensions to the HEVC standard (e.g., for scalable video coding/decoding, for coding/decoding of video with higher fidelity in terms of sample bit depth or chroma sampling rate, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

Intra block copy ("BC") is a prediction mode under development for HEVC extensions. For intra BC prediction mode, the sample values of a current block of a picture are predicted using previously reconstructed sample values in the same picture. A block vector ("BV") indicates a displacement from the current block to a region of the picture that includes the previously reconstructed sample values used for prediction. The BV is signaled in the bitstream. Intra BC prediction is a form of intra-picture prediction-intra BC prediction for a block of a picture does not use any sample values other than sample values in the same picture.

As currently specified in the HEVC standard and implemented in some reference software for the HEVC standard, intra BC prediction mode has several problems. In particular, BV values are not signaled efficiently in many situations, and coding of blocks with predictable BC displacement is not efficiently handled.

SUMMARY

In summary, the detailed description presents innovations in the area of prediction of block vector ("BV") values during encoding or decoding of blocks using intra block copy ("BC") prediction. For example, some of the innovations relate to use of a default BV predictor with a non-zero value. Other innovations relate to use of a selected one of multiple BV predictor candidates for a current block. Still other innovations relate to use of a skip mode in which a current intra-BC-predicted block uses a predicted BV value. In many situations, the innovations improve the coding efficiency of BV values, or otherwise improve coding efficiency for intra-BC-predicted blocks.

According to a first aspect of the innovations described herein, an encoder determines a default BV predictor for a current block of a picture. The default BV predictor includes a BV predictor component with a non-zero value. For example, one of the vertical and horizontal BV components of the default BV predictor is zero, and the other has a non-zero value. The encoder encodes the current block using the default BV predictor. For example, the encoder performs intra block copy ("BC") prediction using a BV value for the current block, determines a BV differential using the BV value and the default BV predictor for the current block, then encodes the BV differential. Or, the encoder simply performs intra BC prediction using the default BV predictor.

A corresponding decoder determines a default BV predictor for a current block of a picture. The default BV predictor includes a BV predictor component with a non-zero value. For example, one of the vertical and horizontal BV components of the default BV predictor is zero, and the other has a non-zero value. The decoder decodes the current block using the default BV predictor. For example, the decoder decodes a BV differential for the current block, then combines the decoded BV differential with the default BV predictor to reconstruct a BV value for the current block. The decoder performs intra BC prediction using the BV value. Or, the decoder simply performs intra BC prediction using the default BV predictor.

The encoder or decoder may conditionally use the default BV predictor depending on whether an actual BV value for a previous block of the picture is available. For example, the encoder/decoder checks whether an actual BV value for a previous block of the picture is available. If so, the actual BV value for the previous block is used as the BV predictor for the current block. Otherwise, the default BV predictor is used as the BV predictor for the current block. In some implementations, an actual BV value for a previous block is available if (1) the previous block and the current block are part of a given coding tree unit, and (2) prediction mode of the previous block is intra BC prediction mode.

According to a second aspect of the innovations described herein, an encoder uses BV prediction to determine a BV value for a current block of a picture. The BV value for the current block indicates a displacement to a region within the picture. The encoder encodes the current block using intra BC with the BV value (here, the BV predictor). The encoder outputs in a bitstream an indication that the current block is encoded in skip mode, and the bitstream lacks a BV differential and residual data for the current block.

A corresponding decoder receives from a bitstream an indication that a current block of a picture is encoded in skip mode. The bitstream lacks a BV differential and residual data for the current block. The decoder uses BV prediction to determine a BV value for the current block. The decoder then decodes the current block using intra block copy prediction with the BV value (here, the BV predictor).

For the skipped block, the bitstream can include an index value that indicates a selection of a BV predictor candidate, from a set of multiple BV predictor candidates, to use as the BV value (here, the BV predictor) for the current block. The index value can be a flag value or integer value.

According to a third aspect of the innovations described herein, an encoder determines a set of multiple BV predictor candidates for a current block of a picture, then selects one of the BV predictor candidates to use for the current block. The encoder encodes the current block using the selected BV predictor candidate, outputting in a bitstream an index value that indicates the selected BV predictor candidate.

A corresponding decoder receives from a bitstream an index value. The decoder determines a set of multiple BV predictor candidates for a current block of a picture and, based on the index value, selects one of the BV predictor candidates to use for the current block. The decoder decodes the current block using the selected BV predictor candidate.

In some cases, the bitstream includes a BV differential for the current block (which is a non-skip mode, non-merge-mode block). The BV differential indicates a difference between the selected BV predictor candidate and the BV value for the current block. In other cases, the current block is a merge-mode block, and the bitstream lacks a BV differential for the current block, but may include residual data for the current block. In still other cases, a value in the bitstream indicates the current block is a skip-mode block. In these cases, the bitstream lacks a BV differential for the current block, and the bitstream lacks residual data for the current block.

In general, the multiple BV predictor candidates include up to x actual BV values of previous blocks. The previous blocks can be identified based at least in part on location in a neighborhood around the current block (e.g., blocks to the left of, above and to the above-right of the current block). Or, the previous blocks can be identified based at least in part on decoding order compared to the current block (e.g., last three intra-BC-predicted blocks). The multiple BV predictor candidates can also include one or more default BV predictors.

The innovations for BV prediction can be implemented as part of a method, as part of a computing device adapted to perform the method or as part of a tangible computer-readable media storing computer-executable instructions for causing a computing device to perform the method. The various innovations can be used in combination or separately. In particular, merge mode for BV prediction can be used in conjunction with default BV predictors with non-zero motion and/or skip mode for intra-BC-predicted blocks. Skip mode for intra-BC-predicted blocks can be used in conjunction with default BV predictors with non-zero motion.

The foregoing and other objects, features, and advantages of the invention will become more apparent from the following detailed description, which proceeds with reference to the accompanying figures.

BRIEF DESCRIPTION OF THE DRAWINGS

FIG. 14 is a diagram illustrating BV predictor candidates among actual BV values of previous blocks in a picture.

FIG. 15 is a diagram illustrating BV predictor candidates among actual BV values of neighboring blocks in a picture.

DETAILED DESCRIPTION

The detailed description presents innovations in the area of prediction of block vector ("BV") values during encoding or decoding of blocks using intra block copy ("BC") prediction. For example, some of the innovations relate to use of a default BV predictor with a non-zero value. Other innovations relate to use of a selected one of multiple BV predictor candidates for a current block. Still other innovations relate to use of a skip mode in which a current intra-BC-predicted block uses a predicted BV value. In many situations, the innovations improve the coding efficiency of BV values, which can lower bit rate and/or improve quality, or otherwise improve coding efficiency for intra-BC-predicted blocks.

Although operations described herein are in places described as being performed by a video encoder or decoder, in many cases the operations can be performed by another type of media processing tool (e.g., image encoder or decoder).

Some of the innovations described herein are illustrated with reference to syntax elements and operations specific to the HEVC standard. For example, reference is made to the draft version JCTVC-O1005 of the HEVC standard—"High Efficiency Video Coding (HEVC) Range Extensions Text Specification: Draft 5," JCTVC-O1005_v3, November 2013. The innovations described herein can also be implemented for other standards or formats.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems

Figure 1:
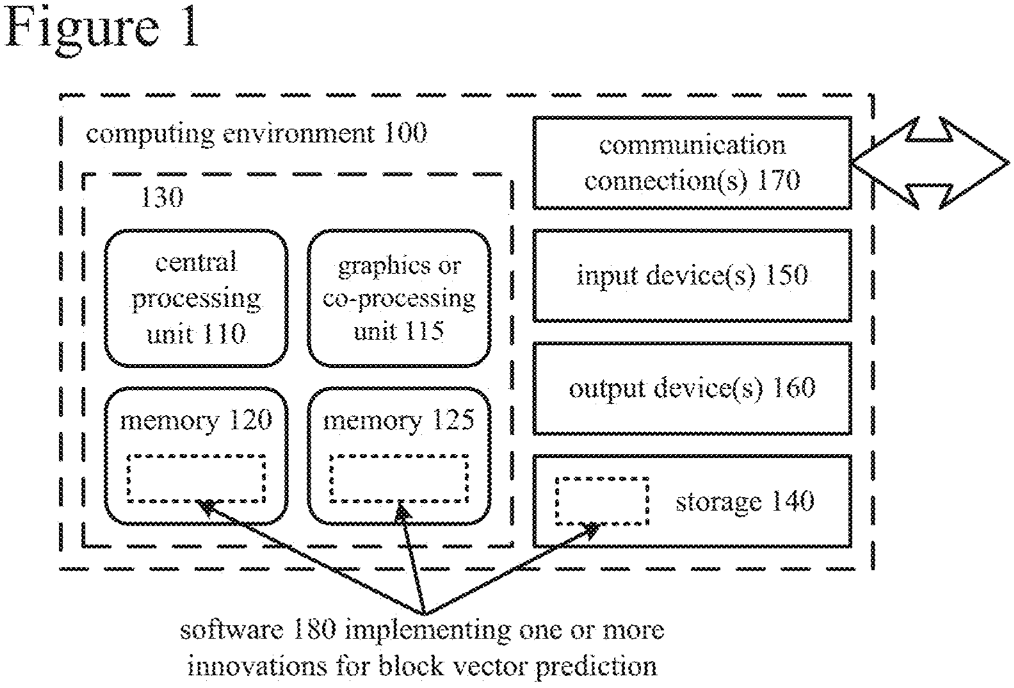
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for block vector prediction, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for block vector prediction.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments

Figure 2A:
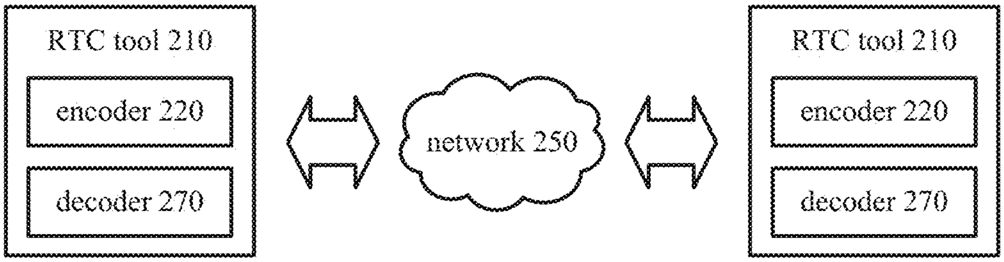
FIGS. 2*a* and 2*b* are diagrams of example network environments in which some described embodiments can be implemented.
Figure 2B:
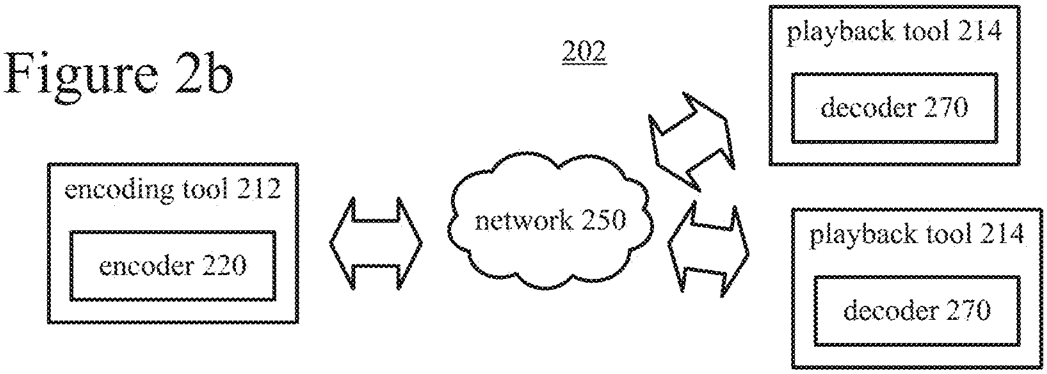

FIGS. 2*a* and 2*b* show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2*a*, each real-time communication ("RTC") tool (210) includes both an encoder (220) and a decoder (270) for bidirectional communication. A given encoder (220) can produce output compliant with a variation or extension of the HEVC standard (also known as H.265), SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-part communication scenario. Although the network environment (201) in FIG. 2*a* includes two real-time communication tools (210), the network environment (201) can instead include three or more real-time communication tools (210) that participate in multi-party communication.

Figure 3:
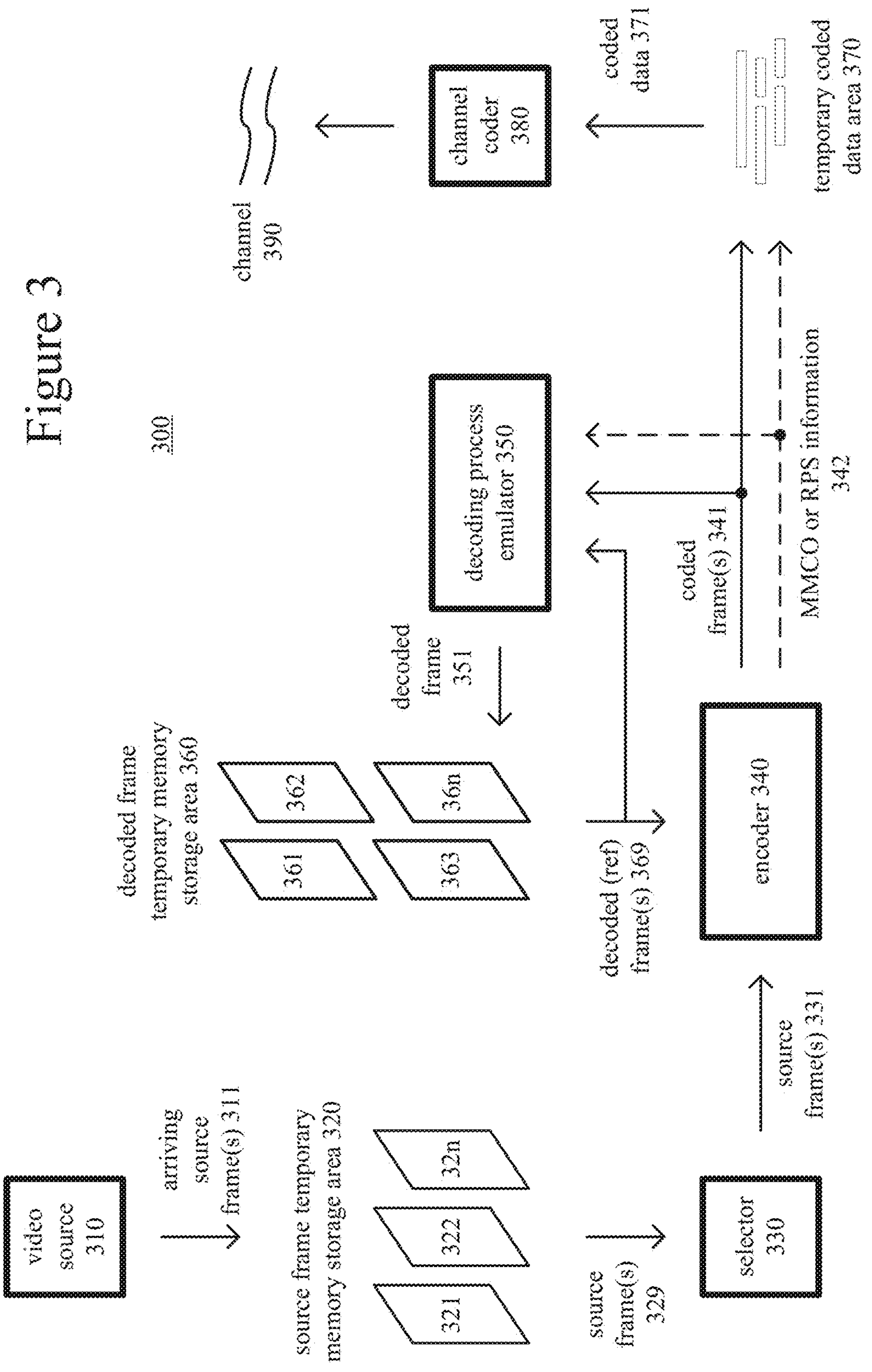
FIG. 3 is a diagram of an example encoder system in conjunction with which some described embodiments can be implemented.
Figure 4:
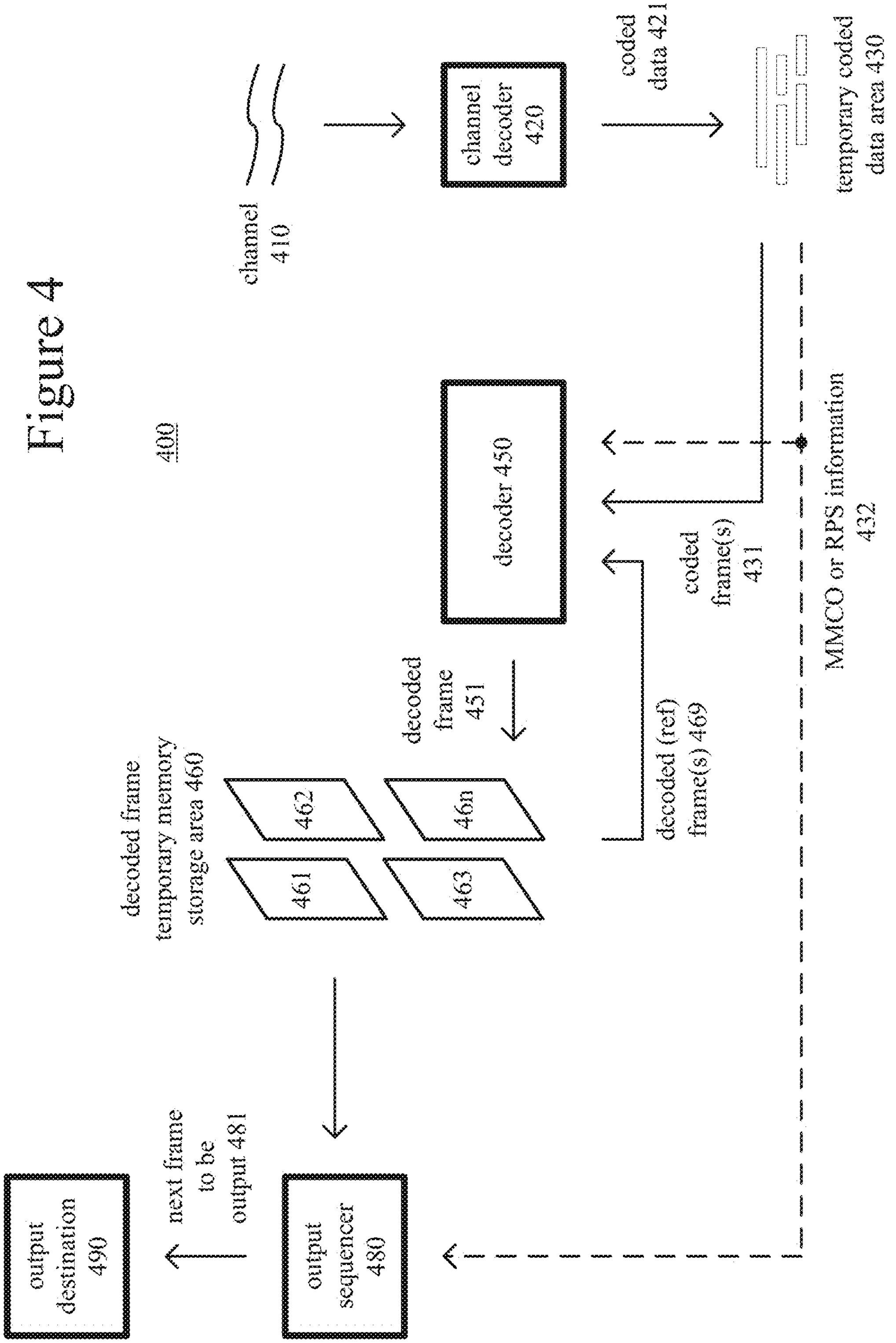
FIG. 4 is a diagram of an example decoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2*b*, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2*b* includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using innovations in BV prediction as described herein.

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame is de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32*n*). A frame buffer (321, 322, etc.) holds one source frame in the source frame storage area (320). After one or more of the source frames (311) have been stored in frame buffers (321, 322, etc.), a frame selector (330) selects an individual source frame from the source frame storage area (320). The order in which frames are selected by the frame selector (330) for input to the encoder (340) may differ from the order in which the frames are produced by the video source (310), e.g., the encoding of some frames may be delayed in order, so as to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Typically, before encoding, video has been converted to a color space such as YUV, in which sample values of a luma (Y) component represent brightness or intensity values, and sample values of chroma (U, V) components represent color-difference values. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format).

The encoder (340) encodes the selected frame (331) to produce a coded frame (341) and also produces memory management control operation ("MMCO") signals (342) or reference picture set ("RPS") information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructured frames may be used as reference frames, and hence should be stored in a frame storage area.

Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of HEVC format (H.265), Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to provide options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of samples for purposes of encoding and decoding.

For syntax according to the HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. As used herein, the term "block" can indicate a CB, PB, TB or other set of sample values, depending on context. The encoder decides how to partition video into CTUs, CUs, PUs, TUs, etc.

Returning to FIG. 3, the encoder represents an intra-coded block of a source frame (331) in terms of prediction from other, previously reconstructed sample values in the frame (331). For intra BC prediction, an intra-picture estimator estimates displacement of a block with respect to the other, previously reconstructed sample values. An intra-frame prediction reference region is a region of samples in the frame that are used to generate BC-prediction values for the block. The intra-frame prediction region can be indicated with a block vector ("BV") value (determined in BV estimation). For intra spatial prediction for a block, the intra-picture estimator estimates extrapolation of the neighboring reconstructed sample values into the block. The intra-picture estimator can output prediction information (such as BV values for intra BC prediction or prediction mode (direction) for intra spatial prediction), which is entropy coded. An intra-frame prediction predictor applies the prediction information to determine intra prediction values.

The encoder (340) represents an inter-frame coded, predicted block of a source frame (331) in terms of prediction from reference frames. A motion estimator estimates the motion of the block with respect to one or more reference frames (369). When multiple reference frames are used, the multiple reference frames can be from different temporal directions or the same temporal direction. A motion-compensated prediction reference region is a region of samples in the reference frame(s) that are used to generate motion-compensated prediction values for a block of samples of a current frame. The motion estimator outputs motion information such as motion vector ("MV") information, which is entropy coded. A motion compensator applies MVs to reference frames (369) to determine motion-compensated prediction values for inter-frame prediction.

The encoder can determine the differences (if any) between a block's prediction values (intra or inter) and corresponding original values. These prediction residual values are further encoded using a frequency transform, quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, index values for BV predictors, BV differentials, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

An adaptive deblocking filter is included within the motion compensation loop in the encoder (340) to smooth discontinuities across block boundary rows and/or columns in a decoded frame. Other filtering (such as de-ringing filtering, adaptive loop filtering ("ALF"), or sample-adaptive offset ("SAO") filtering; not shown) can alternatively or additionally be applied as in-loop filtering operations.

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames. In a manner consistent with the MMCO/RPS information (342), the decoding processes emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , **36*n*). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362**, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Decoder Systems

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and a higher-latency decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include content that has been encoded using innovations in BV prediction as described herein.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0|ISO/IEC 13818-1 or an internet real-time transport protocol format such as IETF RFC 3550), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, intra-frame prediction, motion-compensated inter-frame prediction, inverse quantization, inverse frequency transforms, and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An intra-frame prediction module can spatially predict sample values of a current block from neighboring, previously reconstructed sample values or, for intra BC prediction, predict sample values of a current block using previously reconstructed sample values of an intra-frame prediction region in the frame. The intra-frame prediction region can be indicated with a BV value. The decoder (450) also reconstructs prediction residual values. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency-domain data into spatial-domain data. For an inter-frame predicted block, the decoder (450) combines reconstructed prediction residual values with motion-compensated prediction values. The decoder (450) can similarly combine prediction residual values with prediction values from intra prediction. An adaptive deblocking filter is included within the motion compensation loop in the video decoder (450) to smooth discontinuities across block boundary rows and/or columns in the decoded frame (451). Other filtering (such as de-ringing filtering, ALF, or SAO filtering; not shown) can alternatively or additionally be applied as in-loop filtering operations.

The decoded frame temporary memory storage area (460) includes multiple frame buffer storage areas (461, 462, . . . , 46*n*). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) identifies when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders

Figure 5A:
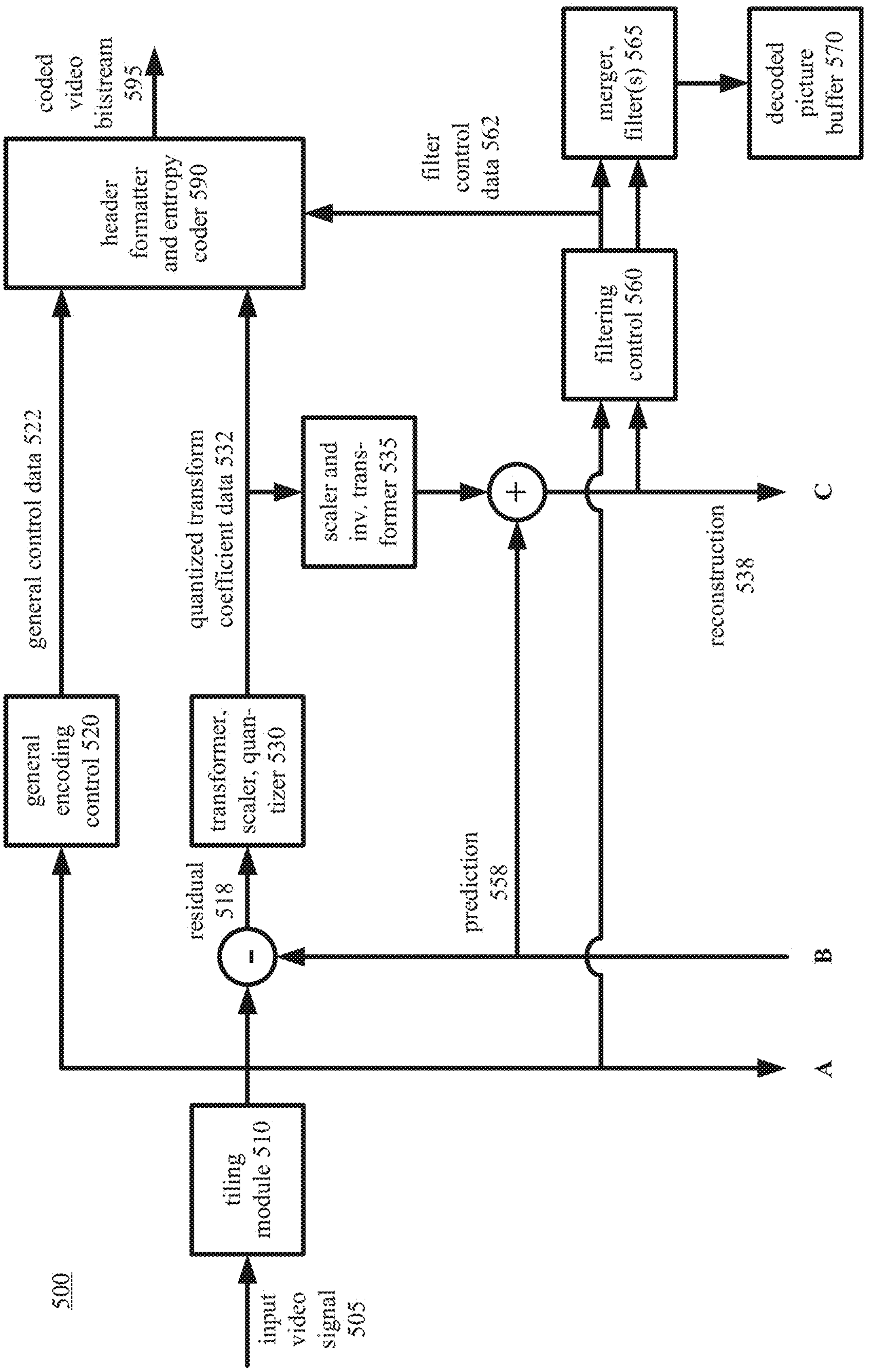
FIGS. 5*a* and 5*b* are diagrams illustrating an example video encoder in conjunction with which some described embodiments can be implemented.
Figure 5B:
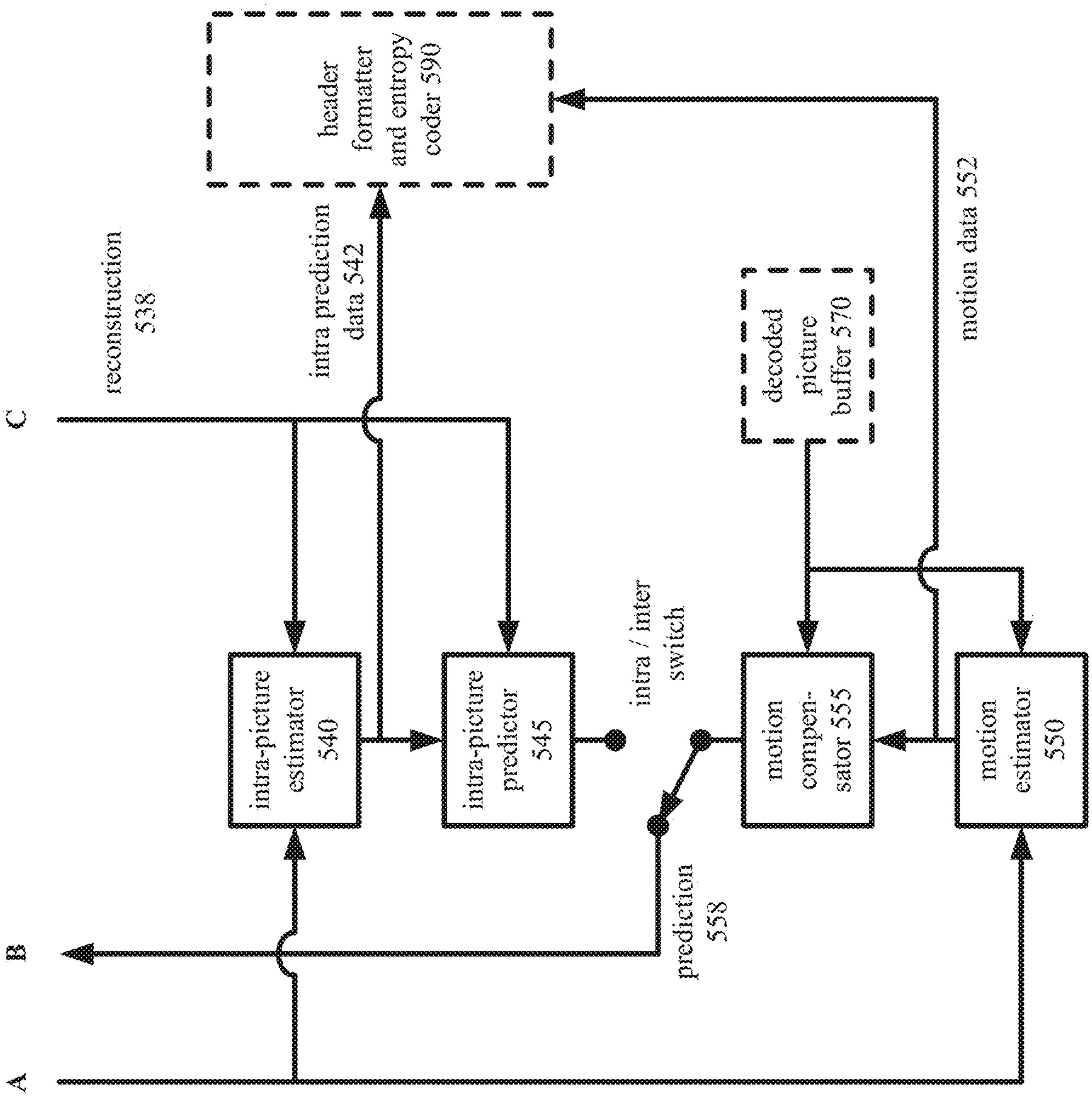

FIGS. 5*a* and 5*b* are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can decide whether and how to use aspects of BV prediction (e.g., skip mode with predicted BV values, merge mode for BV prediction) during encoding. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates the motion of blocks of sample values of the current picture of the input video signal (505) with respect to one or more reference pictures. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as MV data, merge mode index values, and reference picture selection data. The motion data (552) is provided to the header formatter/entropy coder (590) as well as the motion compensator (555).

The motion compensator (555) applies MVs to the reconstructed reference picture(s) from the decoded picture buffer (570). The motion compensator (555) produces motion-compensated predictions for the current picture.

In a separate path within the encoder (500), an intra-picture estimator (540) determines how to perform intra-picture prediction for blocks of sample values of a current picture of the input video signal (505). The current picture can be entirely or partially coded using intra-picture coding.

Using values of a reconstruction (538) of the current picture, for intra spatial prediction, the intra-picture estimator (540) determines how to spatially predict sample values of a current block of the current picture from neighboring, previously reconstructed sample values of the current picture. Or, for intra BC prediction using BV values, the intra-picture estimator (540) estimates displacement of the sample values of the current block to different candidate regions within the current picture.

The intra-picture estimator (540) produces as side information intra prediction data (542), such as information indicating whether intra prediction uses spatial prediction or intra BC prediction (e.g., a flag value per intra block), prediction mode direction (for intra spatial prediction), and BV values (for intra BC prediction). The intra prediction data (542) is provided to the header formatter/entropy coder (590) as well as the intra-picture predictor (545).

According to the intra prediction data (542), the intra-picture predictor (545) spatially predicts sample values of a current block of the current picture from neighboring, previously reconstructed sample values of the current picture. Or, for intra BC prediction, the intra-picture predictor (545) predicts the sample values of the current block using previously reconstructed sample values of an intra-frame prediction region, which is indicated by a BV value for the current block. In some cases (e.g., for a skip-mode block or merge mode block), the BV value can be a BV predictor (predicted BV value). When the chroma data for a picture has the same resolution as the luma data (e.g. when the format is YUV 4:4:4 format or RGB 4:4:4 format), the BV value that is applied for the chroma block may be the same as the BV value applied for the luma block. On the other hand, when the chroma data for a picture has reduced resolution relative to the luma data (e.g. when the format is YUV 4:2:0 format), the BV value that is applied for the chroma block may be scaled down and possibly rounded to adjust for the difference in chroma resolution (e.g. by dividing the vertical and horizontal components of the BV value by two and truncating or rounding them to integer values).

The intra/inter switch selects values of a motion-compensated prediction or intra-picture prediction for use as the prediction (558) for a given block. The difference (if any) between a block of the prediction (558) and a corresponding part of the original current picture of the input video signal (505) provides values of the residual (518), for a non-skip-mode block. During reconstruction of the current picture, for a non-skip-mode block, reconstructed residual values are combined with the prediction (558) to produce a reconstruction (538) of the original content from the video signal (505). In lossy compression, however, some information is still lost from the video signal (505).

In the transformer/scaler/quantizer (530), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (558) is null), producing blocks of frequency transform coefficients. The encoder (500) may also be able to indicate that such transform step is skipped. The scaler/quantizer scales and quantizes the transform coefficients. For example, the quantizer applies dead-zone scalar quantization to the frequency-domain data with a quantization step size that varies on a frame-by-frame basis, tile-by-tile basis, slice-by-slice basis, block-by-block basis, frequency-specific basis or other basis. The quantized transform coefficient data (532) is provided to the header formatter/entropy coder (590).

In the scaler/inverse transformer (535), a scaler/inverse quantizer performs inverse scaling and inverse quantization on the quantized transform coefficients. An inverse frequency transformer performs an inverse frequency transform, producing blocks of reconstructed prediction residual values or sample values. For a non-skip-mode block, the encoder (500) combines reconstructed residual values with values of the prediction (558) (e.g., motion-compensated prediction values, intra-picture prediction values) to form the reconstruction (538). For a skip-mode block, the encoder (500) uses the values of the prediction (558) as the reconstruction (538).

For intra-picture prediction, the values of the reconstruction (538) can be fed back to the intra-picture estimator (540) and intra-picture predictor (545). Also, the values of the reconstruction (538) can be used for motion-compensated prediction of subsequent pictures. The values of the reconstruction (538) can be further filtered. A filtering control (560) determines how to perform deblock filtering and SAO filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the frames. Other filtering (such as de-ringing filtering or ALF; not shown) can alternatively or additionally be applied. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). For the intra prediction data (542), the header formatter/entropy coder (590) selects and entropy codes BV predictor index values (for intra BC prediction), e.g., using context-adaptive binary arithmetic coding. For non-skip-mode, non-merge-mode blocks, the header formatter/entropy coder (590) determines BV differentials for BV values (relative to BV predictors for the BV values), then entropy codes the BV differentials, e.g., using context-adaptive binary arithmetic coding. For a skip-mode block or merge-mode block, the BV differential is omitted.

The header formatter/entropy coder (590) provides the encoded data in the coded video bitstream (595). The format of the coded video bitstream (595) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders

Figure 6:
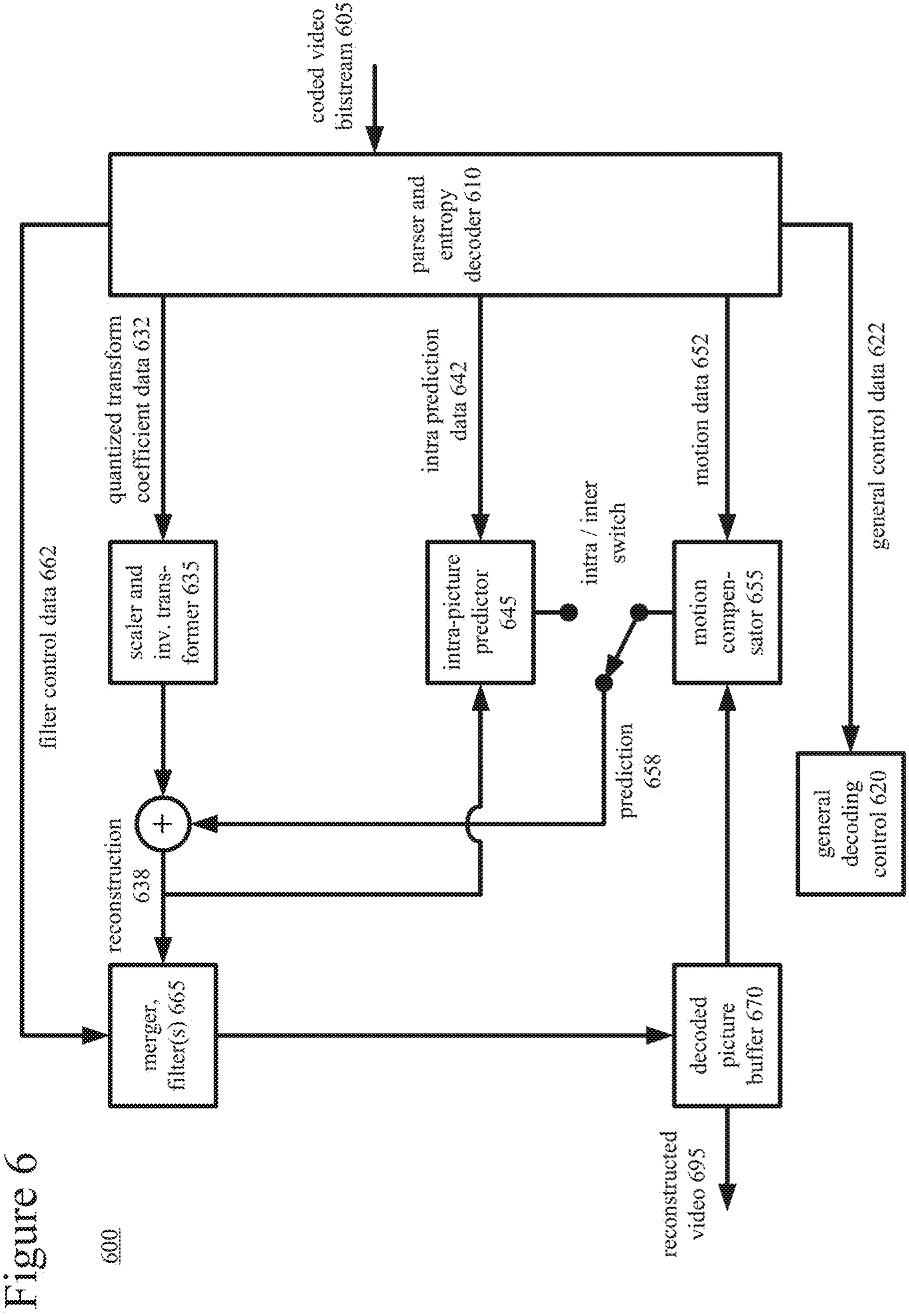
FIG. 6 is a diagram illustrating an example video decoder in conjunction with which some described embodiments can be implemented.

FIG. 6 is a block diagram of a generalized decoder (600) in conjunction with which some described embodiments may be implemented. The decoder (600) receives encoded data in a coded video bitstream (605) and produces output including pictures for reconstructed video (695). The format of the coded video bitstream (605) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

The decoder (600) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the HEVC standard, a picture is partitioned into CTUs (CTBs), CUs (CBs), PUs (PBs) and TU (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652) and filter control data (662). For the intra prediction data (642), the parser/entropy decoder (610) entropy decodes BV predictor index values (for intra BC prediction), e.g., using context-adaptive binary arithmetic decoding. For non-skip-mode, non-merge-mode blocks, the parser/entropy decoder (610) also entropy decodes BV differentials for BV values (e.g., using context-adaptive binary arithmetic decoding), then combines the BV differentials with corresponding BV predictors to reconstruct the BV values. For a skip-mode block or merge-mode block, the BV differential is omitted from the bitstream, and the BV value is simply the BV predictor (e.g., indicated with the BV predictor index value).

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding.

If the current picture is predicted using inter-picture prediction, a motion compensator (655) receives the motion data (652), such as MV data, reference picture selection data and merge mode index values. The motion compensator (655) applies MVs to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures.

In a separate path within the decoder (600), the intra-frame prediction predictor (645) receives the intra prediction data (642), such as information indicating whether intra prediction uses spatial prediction or intra BC prediction (e.g., a flag value per intra block), prediction mode direction (for intra spatial prediction) and BV values (for intra BC prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture. Or, for intra BC prediction using BV values, the intra-picture predictor (645) predicts the sample values of the current block using previously reconstructed sample values of an intra-frame prediction region, which is indicated by a BV value for the current block.

The intra/inter switch selects values of a motion-compensated prediction or intra-picture prediction for use as the prediction (658) for a given block. For example, when HEVC syntax is followed, the intra/inter switch can be controlled based on a syntax element encoded for a CU of a picture that can contain intra-predicted CUs and inter-predicted CUs. For a non-skip-mode block, the decoder (600) combines the prediction (658) with reconstructed residual values to produce the reconstruction (638) of the content from the video signal. For a skip-mode block, the decoder (600) uses the values of the prediction (658) as the reconstruction (638).

To reconstruct the residual for a non-skip-mode block, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof).

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the frames. Other filtering (such as de-ringing filtering or ALF; not shown) can alternatively or additionally be applied. Tile boundaries can be selectively filtered or not filtered at all, depending on settings of the decoder (600) or a syntax indication within the encoded bitstream data. The decoded picture buffer (670) buffers the reconstructed current picture for use in subsequent motion-compensated prediction.

The decoder (600) can also include a post-processing filter. The post-processing filter (608) can include de-ringing filtering, adaptive Wiener filtering, film-grain reproduction filtering, SAO filtering or another kind of filtering.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Innovations in Block Vector Prediction

This section presents various features of block vector ("BV") prediction. Some of the features relate to use of a default BV predictor, while other features relate to merge mode for BV predictors or skip mode for intra block copy ("BC") prediction. These features can facilitate intra BC prediction that is more effective in terms of rate-distortion performance.

In particular, the described innovations can improve rate-distortion performance when encoding certain "artificially" created video content such as screen-capture content. Screen-capture content typically includes repeated structures (e.g., graphics, text characters), which provide opportunities for intra BC prediction to improve performance. Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0). Common scenarios for encoding/decoding of screen-capture content include remote desktop conferencing and encoding/decoding of graphical overlays on natural video or other "mixed content" video.

A. Intra BC Prediction Mode, BV Values and BV Prediction—Introduction

For intra BC prediction, the sample values of a current block of a picture are predicted using sample values in the same picture. A BV value indicates a displacement from the current block to a region of the picture that includes the sample values used for prediction. The sample values used for prediction are previously reconstructed sample values. The BV value can be signaled in the bitstream, and a decoder can use the BV value to determine the region of the picture to use for prediction, which is also reconstructed at the decoder. Intra BC prediction is a form of intra-picture prediction-intra BC prediction for a block of a picture does not use any sample values other than sample values in the same picture.

Figure 7A:
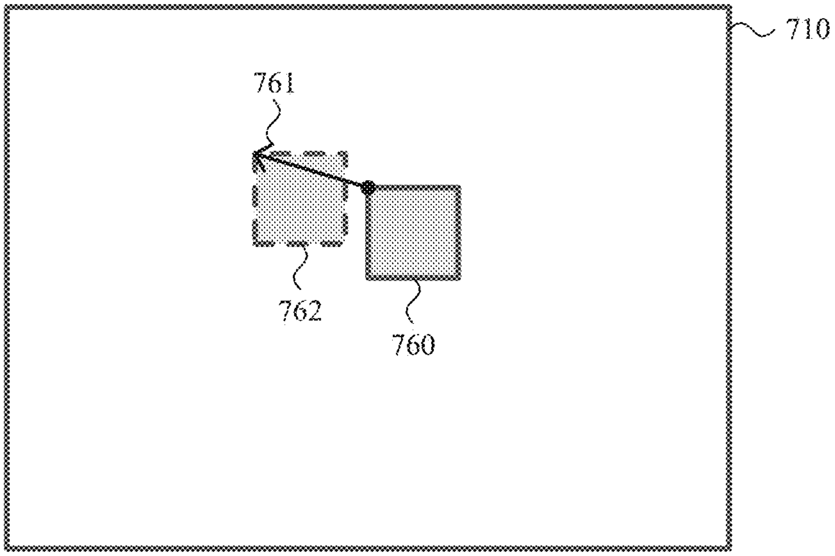
FIGS. 7*a*-7*d* are diagrams illustrating intra BC prediction for a block of a picture, BV prediction for the block, a default (0, 0) BV predictor, and a default BV predictor with a non-zero value, respectively.

FIG. 7*a* illustrates intra BC prediction for a current block (760) of a current frame (710). The current block can be a coding block ("CB") of a coding unit ("CU"), prediction block ("PB") of a prediction unit ("PU"), transform block ("TB") of a transform unit ("TU") or other block. The size of the current block can be 64×64, 32×32, 16×16, 8×8 or some other size. More generally, the size of the current block is m×n, where each of m and n is a whole number, and where m and n can be equal to each other or can have different values. Alternatively, the current block can have some other shape (e.g., an area of a coded video object with a non-rectangular shape).

The BV (761) indicates a displacement (or offset) from the current block (760) to a region (762) of the picture that includes the sample values used for prediction. The intra-frame prediction region (762) indicated by the BV (761) is sometimes termed the "matching block" for the current block (760). The matching block can be identical to the current block (760), or it can be an approximation of the current block (760). Suppose the top left position of a current block is at position $(x_0, y_0)$ in the current frame, and suppose the top left position of the intra-frame prediction region is at position $(x_1, y_1)$ in the current frame. The BV indicates the displacement $(x_1-x_0, y_1-y_0)$. For example, if the top left position of the current block is at position (256, 128), and the top left position of the intra-frame prediction region is at position (176, 104), the BV value is (−80, −24). In this example, a negative horizontal displacement indicates a position to the left of the current block, and a negative vertical displacement indicates a position above the current block.

Intra BC prediction can improve coding efficiency by exploiting redundancy (such as repeated patterns inside a frame) using BC operations. The sample values of a current block are represented using a BV value instead of directly encoding the sample values of the current block. Even if the sample values of the current block do not exactly match the sample values of the intra-frame prediction region indicated with the BV value, the differences may be negligible (not perceptually noticeable). Or, if the differences are significant, the differences may be encoded as residual values that can be compressed more efficiently than the original sample values for the current block.

Collectively, BV values for blocks encoded using intra BC prediction can consume a significant number of bits. The BV values can be entropy encoded to reduce bit rate. To further reduce bit rate for BV values, an encoder can use prediction of the BV values. BV values often exhibit redundancy—the BV value for a given block is often similar to, or even the same as, the BV values of previous blocks in the picture. For BV prediction, the BV value for the given block is predicted using a BV predictor. The difference (or BV differential) between the BV value for the given block and the BV predictor is then entropy coded. Typically, the BV differential is computed for horizontal and vertical components of the BV value and BV predictor. When BV prediction works well, BV differentials have a probability distribution that supports efficient entropy coding. In the current draft version of the HEVC standard (JCTVC-O1005), the BV predictor is the BV value of the last coded CU within the current CTU (that is, the BV value of the previous intra-BC-predicted block within the current CTU).

Figure 7B:
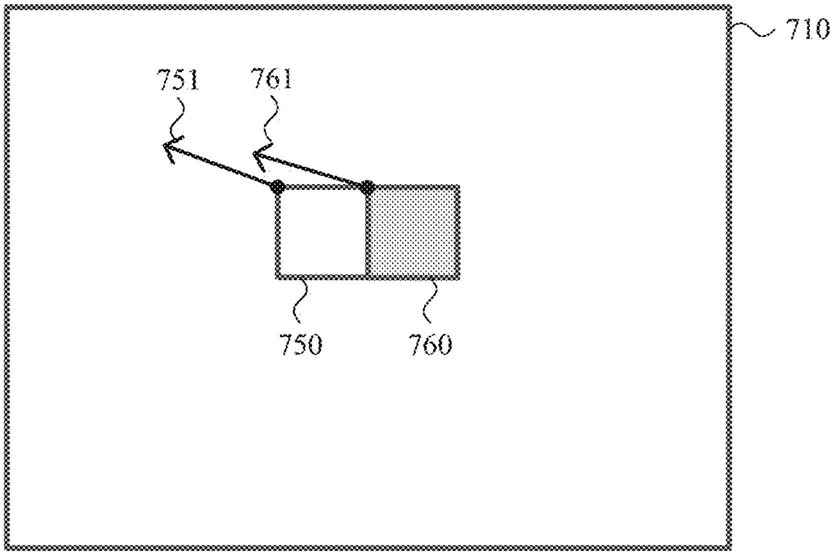

FIG. 7*b* shows a BV (761) of a current block (760) in a frame as well as a BV (751) of a previous block (750) in the frame (710). The BV (751) of the previous block (750) is used as the BV predictor for the BV (761) of the current block (760). For example, if the BV value is (−80, −24) and the BV predictor is (−80, −32), the BV differential of (0, 8) is entropy encoded.

A decoder receives and entropy decodes the entropy coded BV differential for a BV value. The decoder also determines a BV predictor for the BV value. The BV predictor determined by the decoder is the same as the BV predictor determined by the encoder. The decoder combines the BV predictor and decoded BV differential to reconstruct the BV value.

Figure 7C:
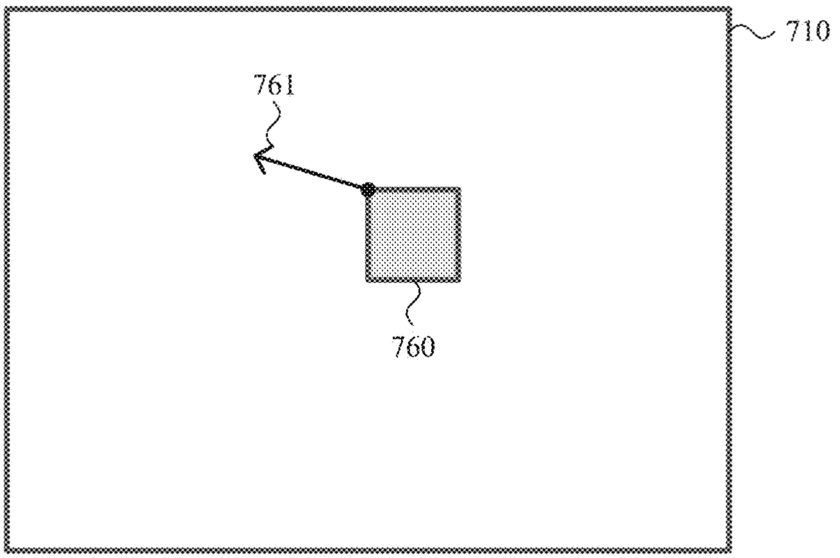

In the current draft version of the HEVC standard (JCTVC-O1005_v3), a BV predictor based on an actual BV value is not available in some situations. For example, a previous actual BV value is not available for the first intra BC-predicted block in a given CTU. When a previous actual BV value is not available for the BV predictor (as shown in FIG. 7*c*), a default value of (0, 0) is used as the BV predictor. In effect, this means BV prediction is skipped when no BV value is available for a previous intra-BC-predicted block in the CTU.

B. Default BV Predictor With Non-zero Component

According to one aspect of the innovations described herein, when a previous actual BV value is not available for use as a BV predictor for the BV value of a current block, an encoder and decoder use a default BV predictor with a non-zero component. Compared to a zero-value default BV predictor, a default BV predictor with a non-zero component tends to be closer to the BV value of the current block, which results more efficient entropy coding of the BV differential. Also, a default BV predictor with a non-zero value can provide a useful option for skip mode or merge mode for BV prediction.

1. Example Default BV Predictors

Figure 7D:
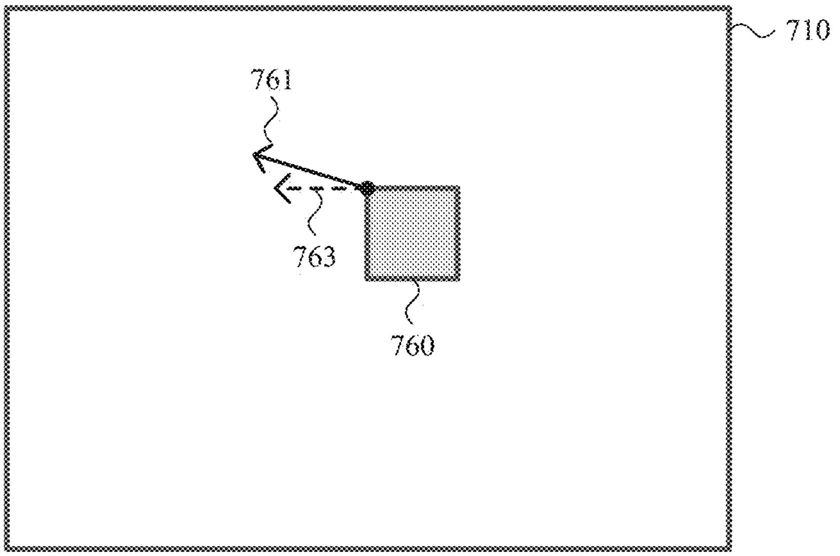

As shown in FIG. 7*d*, for the BV value (761) of the current block (760), the default BV predictor (763) can have a non-zero horizontal component. For example, the default BV predictor is a horizontal vector (BVx, 0). The value of the horizontal BV component BVx can be a fixed non-zero value. Or, the value of BVx can be the width of the current block, which is the smallest value of horizontal BV component BVx that avoids overlap between the current block and the reference region.

For example, when the current block is a CB of a CU having width W and height H, the value of the horizontal BV component BVx for the default BV predictor can be a negative offset equal to the width W of the CU. That is, the default BV predictor can be (−W, 0). The default BV predictor (BVx, 0) can be used whenever a regular BV predictor (based on an actual BV value of a previous block) is unavailable. Or, the default BV predictor (BVx, 0) can be conditionally used depending on the BV value of the current block. For example, if the vertical BV component of the BV value of the current block is less than −H, the default BV predictor is (−W, 0). Otherwise (the vertical BV component of the BV value of the current block is not less than −H), the default BV predictor is (0, 0). This condition ensures that the default BV predictor of (−W, 0) is not applied when the BV value of the current block has a significant vertical BV component. Alternatively, the non-zero default BV predictor (BVx, 0) is conditionally applied according to another condition.

Instead of having a negative offset of −W, the default BV predictor can have another negative offset. For example, the default BV predictor can be (−2*W, 0).

Alternatively, the default BV predictor is a vertical vector (0, BVy). The value of the vertical BV component BVy can be a fixed non-zero value, or the value of BVy can be the height of the current block, which is the smallest value of BVy that avoids overlap between the current block and the reference region. For example, when the current block is a CB of a CU having width W and height H, the default BV predictor can be (0, −H). The default BV predictor (0, BVy) can be used whenever a regular BV predictor is unavailable, or the default BV predictor (0, BVy) can be conditionally used depending on the BV value of the current block.

Alternatively, the default BV predictor can have a non-zero horizontal component and non-zero vertical component.

2. Example Encoding With Default BV Predictors

Figure 8:
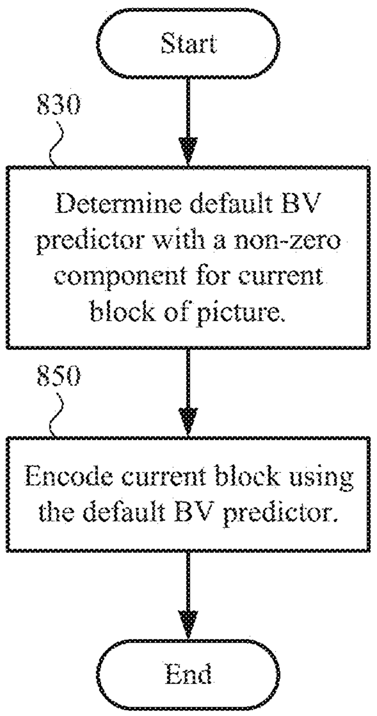
FIGS. 8 and 9 are flowcharts illustrating techniques for encoding that includes use of a default BV predictor with a non-zero value.

FIG. 8 shows a generalized technique (800) for using a default BV predictor with a non-zero component during encoding. An image encoder or video encoder such as one described with reference to FIG. 3 or FIGS. 5*a*-5*b* can perform the technique (800).

The encoder determines (830) a default BV predictor for a current block of a picture. For example, in HEVC implementations, the current block is a part of a coding unit of a coding tree unit. The default BV predictor includes a BV predictor component with a non-zero value. For example, the BV predictor component with a non-zero value is a horizontal BV component. Depending on implementation, the non-zero horizontal BV component can have a fixed value (independent of the size of the current block), a value equal to the width of the current block, or some other non-zero value. Or, the BV predictor component with a non-zero value is a vertical BV component. Depending on implementation, the non-zero vertical BV component can have a fixed value (independent of the size of the current block), a value equal to the height of the current block, or some other non-zero value. Or, the default BV predictor can include a non-zero horizontal BV component and a non-zero vertical BV component. The default BV predictor can be part of a set of multiple BV predictor candidates assembled for skip mode, as described in section C, or for merge mode, as described in section D.

The encoder encodes (850) the current block using the default BV predictor. For example, the encoder (a) performs intra BC prediction using a BV value for the current block, (b) determines a BV differential using the BV value and the default BV predictor for the current block, and (c) encodes the BV differential. Alternatively, the encoder simply performs intra BC prediction using the default BV predictor.

Figure 9:
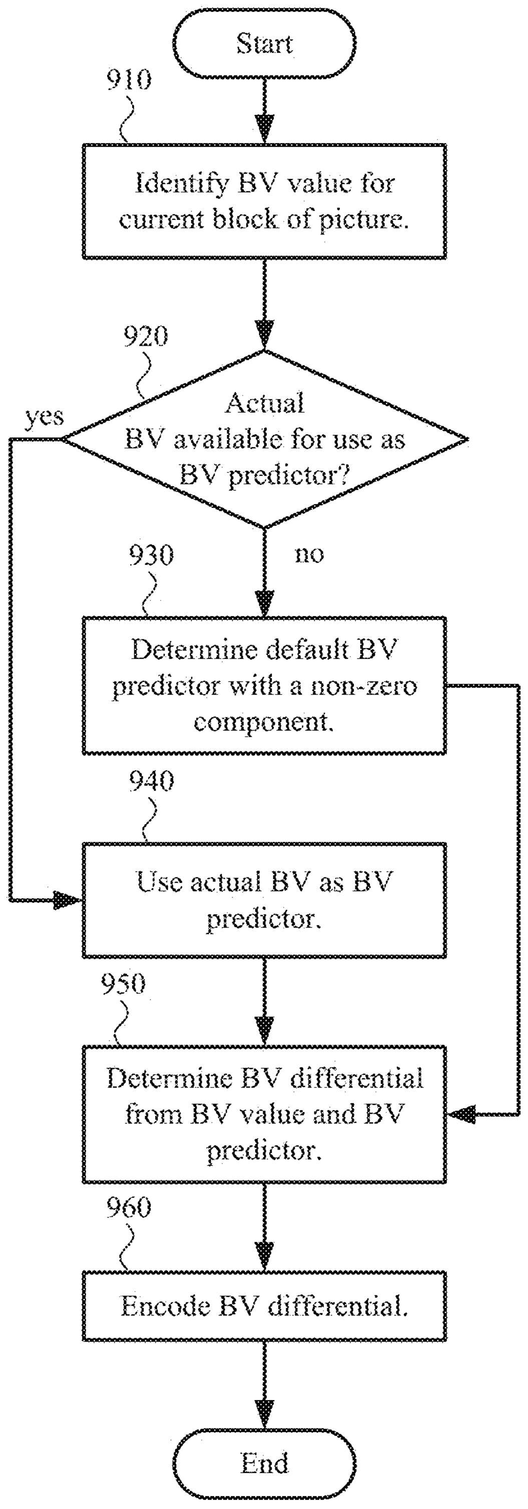

FIG. 9 shows a more detailed example technique (900) for using a default BV predictor with a non-zero component during encoding. An image encoder or video encoder such as one described with reference to FIG. 3 or FIGS. 5*a*-5*b* can perform the technique (900).

To start, the encoder identifies (910) a BV value for a current block of a picture. The encoder can use any form of BV estimation to identify the BV value for the current block. In HEVC implementations, the current block is a part of a coding unit of a coding tree unit.

The encoder checks (920) whether an actual BV is available for use as BV predictor. For example, the encoder checks whether an actual BV value for a previous block of the picture is available. In HEVC implementations, an actual BV value for a previous block is available if (1) the previous block and the current block are part of the same CTU, and (2) the prediction mode of the previous block is intra BC prediction mode. An actual BV value for a previous block is not available, for example, for the first intra-BC-predicted block of a given CTU.

If an actual BV is available for use as BV predictor, the encoder uses (940) the actual BV as the BV predictor. On the other hand, if no actual BV for any previous block is available for use as BV predictor, the encoder determines (930) a default BV predictor for the current block. The default BV predictor includes a BV predictor component with a non-zero value. For example, the default BV predictor is determined as described above with respect to act (830) of FIG. 8.

The encoder determines (950) a BV differential between the BV value for the current block and the BV predictor. The encoder entropy codes (960) the BV differential.

3. Example Decoding With Default BV Predictors

Figure 10:
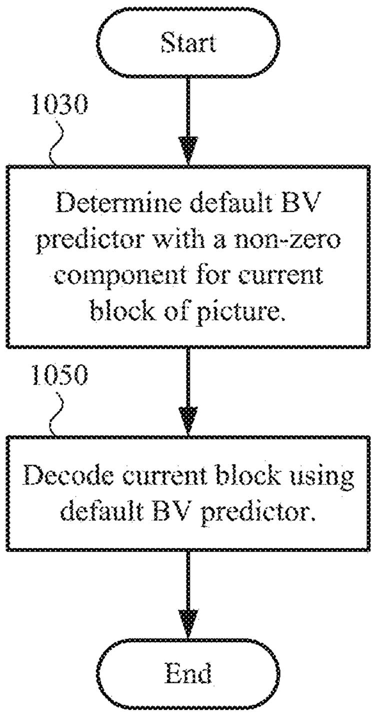
FIGS. 10 and 11 are flowcharts illustrating techniques for decoding that includes use of a default BV predictor with a non-zero value.

FIG. 10 shows a generalized technique (1000) for using a default BV predictor with a non-zero component during decoding. An image decoder or video decoder such as one described with reference to FIG. 4 or FIG. 6 can perform the technique (1000).

The decoder determines (1030) a default BV predictor for a current block of a picture. For example, in HEVC implementations, the current block is a part of a coding unit of a coding tree unit. The default BV predictor includes a BV predictor component with a non-zero value. For example, the BV predictor component with a non-zero value is a horizontal BV component. Depending on implementation, the non-zero horizontal BV component can have a fixed value (independent of the size of the current block), a value equal to the width of the current block, or some other non-zero value. Or, the BV predictor component with a non-zero value is a vertical BV component. Depending on implementation, the non-zero vertical BV component can have a fixed value (independent of the size of the current block), a value equal to the height of the current block, or some other non-zero value. Or, the default BV predictor can include a non-zero horizontal BV component and a non-zero vertical BV component. The default BV predictor can be part of a set of multiple BV predictor candidates assembled for skip mode, as described in section C, or for merge mode, as described in section D.

The decoder decodes (1050) the current block using the default BV predictor. For example, the encoder (a) decodes a BV differential for the current block, (b) combines the decoded BV differential with the default BV predictor to reconstruct a BV value for the current block, and (c) performs intra BC prediction using the BV value for the current block. Alternatively, the decoder simply performs intra BC prediction using the default BV predictor.

Figure 11:
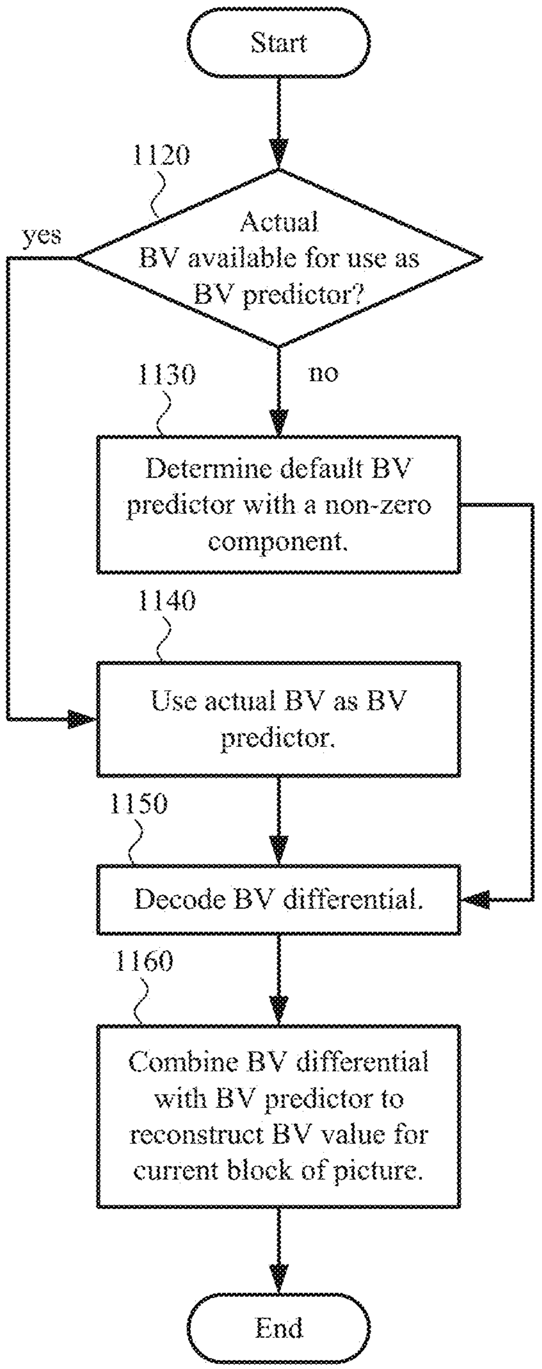

FIG. 11 shows a more detailed example technique (1100) for using a default BV predictor with a non-zero component during decoding. An image decoder or video decoder such as one described with reference to FIG. 4 or FIG. 6 can perform the technique (1100).

The decoder checks (1120) whether an actual BV is available for use as BV predictor for a BV value for a current block of a picture. For example, the decoder checks whether an actual BV value for a previous block of the picture is available. In HEVC implementations, an actual BV value for a previous block is available if (1) the previous block and the current block are part of the same CTU, and (2) the prediction mode of the previous block is intra BC prediction mode. An actual BV value for a previous block is not available, for example, for the first intra-BC-predicted block of a given CTU.

If an actual BV is available for use as BV predictor, the decoder uses (1140) the actual BV as the BV predictor. On the other hand, if no actual BV for any previous block is available for use as BV predictor, the decoder determines (1130) a default BV predictor for the current block. The default BV predictor includes a BV predictor component with a non-zero value. For example, the default BV predictor is determined as described above with respect to act (1030) of FIG. 10.

The decoder also entropy decodes (1150) a BV differential for the current block. The decoder then combines (1160) the BV differential with the BV predictor to reconstruct the BV value for the current block.

4. Alternatives and Variations

In the examples of default BV predictors described above, the value of the default BV predictor is not constrained depending on location of the current block. Alternatively, the value of the default BV predictor can be constrained depending on the location of the current block. For example, if the current block is at the edge of a picture, such that the default BV predictor would point to a location outside the picture, the default BV predictor is constrained to point to a location within the picture, or a (0, 0) BV predictor is used. Or, as another example for HEVC implementations in which BV values are constrained reference a location in some set of CTUs (e.g., the current CTU and previous CTU), the default BV predictor is constrained to reference a location within that set of CTUs. Or, as another example for HEVC implementations in which a picture includes multiple tiles or multiple slices, BV values (and default BV predictors) may be constrained to reference a location with the current tile (and/or current slice).

In the examples of default BV predictors described above, the value of the default BV predictor does not switch depending on location of the current block. Alternatively, the value of the default BV predictor can switch depending on the location of the current block. For example, the default BV predictor is a horizontal BV predictor (BVx, 0) if the current block is anywhere except the left edge of the picture (or tile, or slice, if used). If the current block is at the left edge of the picture (or tile, or slice, if used), or the default horizontal BV predictor would otherwise reference a location outside the picture (or tile, or slice, if used), the default BV predictor is a vertical BV predictor (0, BVy). And, if the current block is at the top left corner of the picture (or tile, or slice, if used), or the default horizontal BV predictor and vertical BV predictor would otherwise reference a location outside the picture (or tile, or slice, if used), the default BV predictor is a (0, 0) BV predictor.

C. Skip Mode for Intra BC Prediction

According to another aspect of the innovations described herein, an encoder and decoder use skip mode for certain intra-BC-predicted blocks. In skip mode, an intra-BC-predicted block uses a predicted BV value and has no residual data in the bitstream. In some scenarios, use of skip mode for intra-BC-predicted blocks can significantly improve rate-distortion efficiency.

In general, an encoder decides when to use skip mode for a current intra-BC-predicted block. The encoder can decide to use skip mode based on how closely an intra-BC-prediction region matches a current block, based on the perceptual importance of residual values, based on the bitrate available for encoding of residual values, and/or based on other factors. The encoder can favor skip mode for intra-BC-predicted blocks in certain encoding modes in which encoding speed is a constraint, e.g., real-time encoding.

Figure 12:
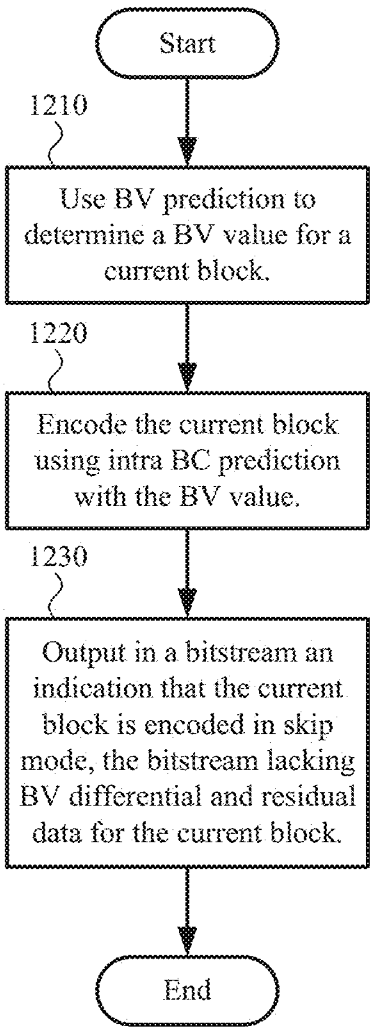
FIGS. 12 and 13 are flowcharts illustrating techniques for encoding and decoding, respectively, that includes skip mode for intra-BC-predicted blocks.

FIG. 12 shows a generalized technique (1200) for encoding that includes skip mode for intra-BC-predicted blocks.

An image encoder or video encoder such as one described with reference to FIG. 3 or FIGS. 5*a*-5*b* can perform the technique (1200).

For a current block of a picture, if the current block is an intra-BC-predicted block encoded in skip mode, the encoder uses (1210) BV prediction to determine a BV value for the current block. The BV value for the current block indicates a displacement to a region within the picture. The BV prediction can include merge mode prediction, prediction using the BV value of the last coded intra-BC-predicted block, prediction using a component-wise median of BV values of neighboring intra-BC-predicted blocks, or some other form of BV prediction. The current block is, for example, a part of a CU of a CTU.

The encoder encodes (1220) the current block using intra BC prediction with the BV value (here, the predicted BV value). The encoder outputs (1230) in a bitstream an indication that the current block is encoded in skip mode. Since the block is encoded in skip mode, the bitstream lacks a BV differential and residual data for the current block. The bitstream can include, however, an index value that indicates a selection of a BV predictor candidate, from a set of multiple BV predictor candidates, to use as the BV value for the current block. For example, when the set of multiple BV predictor candidates has two BV predictor candidates, the index value is a flag value. Or, when the set of multiple BV predictor candidates has more than two BV predictor candidates, the index value is an integer value. The index value can be entropy coded, e.g., using arithmetic coding.

Figure 13:
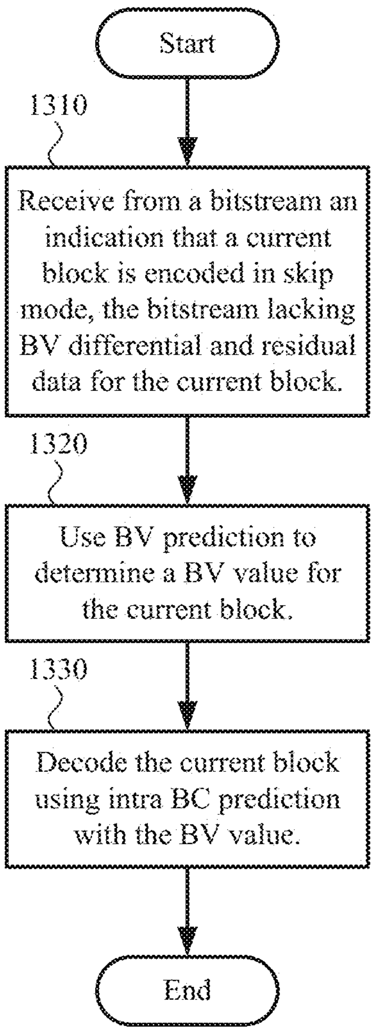

FIG. 13 shows a generalized technique (1300) for decoding that includes skip mode for intra-BC-predicted blocks. An image decoder or video decoder such as one described with reference to FIG. 4 or FIG. 6 can perform the technique (1300).

For a current block of a picture, if the current block is an intra-BC-predicted block encoded in skip mode, the decoder receives (1310) from a bitstream an indication that the current block is encoded in skip mode. Since the block is encoded in skip mode, the bitstream lacks a BV differential and residual data for the current block. As described above, however, the bitstream can include an index value that indicates a selection of a BV predictor candidate, from a set of multiple BV predictor candidates, to use as the BV value for the current block. The current block is, for example, a part of a CU of a CTU.

The decoder uses (1320) BV prediction to determine a BV value for the current block. The BV prediction generally mirrors the BV prediction performed at the encoder. It can include merge mode prediction, prediction using the BV value of the last coded intra-BC-predicted block, prediction using a component-wise median of BV values of neighboring intra-BC-predicted blocks, or some other form of BV prediction. The decoder decodes (1330) the current block using intra BC prediction with the BV value (here, the predicted BV value).

D. Merge Mode for BV Prediction

According to another aspect of the innovations described herein, an encoder and decoder use merge mode for BV prediction. Merge mode can significantly improve the quality of BV prediction, which in turn reduces the amount of bits consumed by BV differentials in the bitstream.

For merge mode, when determining a BV predictor for a block, an encoder assembles a set of BV predictor candidates, selects one of the BV predictor candidates to use as the BV predictor for the block, and signals in the bitstream an index value that indicates the selected BV predictor candidate. A decoder assembles the set of BV predictor candidates and, based on the signaled index value, selects one of the BV predictor candidates to use as the BV predictor for the block. Although the index values consume bits in the bitstream, merge mode can significantly improve BV prediction and hence reduce bits consumed by BV differentials, resulting in an overall reduction in bitrate.

In example implementations, merge mode for BV prediction is used in combination with skip mode for intra-BC-predicted blocks. Alternatively, merge mode for BV prediction can be used even if skip mode is not enabled for intra-BC-predicted blocks.

1. Example BV Predictor Candidates and Index Values

When determining a BV predictor for a block in merge mode, an encoder or decoder assembles a set of BV predictor candidates. The constituents of the set of BV predictor candidates depend on implementation, but are the same at the encoder side and the decoder side.

In one approach, BV predictor candidates are assembled from among actual BV values of previously coded blocks in a picture. In general, the encoder and decoder determine up to x actual BV values of previous blocks in the picture. The previous blocks are previously coded intra-BC-predicted blocks in the picture. In particular, they are the x closest intra-BC-predicted blocks earlier in decoding order than the current block. The value of x depends on implementation and can be, for example, 2, 3, 4, 5 or some other number. Using more BV predictor candidates tends to increase bit rate for index values but improve the quality of BV prediction, which in turn reduces bits consumed by BV differentials.

The previous intra-BC-predicted blocks need not be neighbors of the current block. If less than x previous blocks with actual BV values are available, the set of BV predictor candidates can include less than x BV predictor candidates.

FIG. 14 shows an example of this approach. In FIG. 14, three BV values (1431, 1441, 1451) of three previous intra-BC-predicted blocks (1430, 1440, 1450) provide the BV predictor candidates for merge mode for the BV predictor of a current block (1460) of a current frame (1410). Although the previous blocks (1430, 1440, 1450) are contiguous in the example of FIG. 14, the previous blocks need not be contiguous. (That is, the previous intra-BC-predicted blocks that provide BV predictor candidates can be separated by other, non-intra-BC-predicted blocks in the picture.)

The set of BV predictor candidates can further include one or more default BV predictors. In the example of FIG. 14, the set of BV predictor candidates includes a default BV predictor (BVx, 0) with horizontal displacement and a default BV predictor (0, BVy) with vertical displacement. In particular, default BV predictors with horizontal displacement and vertical displacement tend to be useful for text content, which generally follows a pure horizontal or vertical direction.

Merge mode index values are associated with the respective BV predictor candidates. Typically, smaller index values are associated with BV predictor candidates that are more likely to be selected, and larger index values are associated with BV predictor candidates that are less likely to be selected, which tends to reduce bit rate for the index values after entropy coding. In FIG. 14, index values idx 0 . . . idx 4 are assigned to the BV predictor candidates with BV values (1451, 1441, 1431) and default BV predictors according to expected likelihood of selection.

For example, in some implementations, two actual BV values of previously coded blocks are stored as BV predictor candidates $BV_{cand0}$ and $BV_{cand1}$. After a new BV value has been used, the older BV predictor candidate $BV_{cand1}$ is replaced with the newer BV predictor candidate $BV_{cand0}$, and the newer BV predictor candidate $BV_{cand0}$ is replaced with the BV value that was just used. At the encoder side, for a current block, the encoder selects one of $BV_{cand0}$ and $BV_{cand1}$ to use as BV predictor. As a merge mode index value, the encoder signals a flag value that indicates which one of $BV_{cand0}$ and $BV_{cand1}$ has been used by the encoder and should be used by the decoder. At the decoder side, a decoder receives and parses the flag value and, based on the flag value, selects one of $BV_{cand0}$ and $BV_{cand1}$ to use as the BV predictor for the block. In this approach, the encoder and the decoder each store and update two BV predictor candidates $BV_{cand0}$ and $BV_{cand1}$.

As another example, in some other implementations, one actual BV value of a previously coded block is stored as a first BV predictor candidate $BV_{cand0}$, and a default BV predictor is stored as a second BV predictor candidate $BV_{cand1}$. For example, the default BV predictor is (BVx, 0), where BVx can be a negative offset equal to the width W of the current block or have some other non-zero value. After a new BV value has been used, the first BV predictor candidate $BV_{cand0}$ is replaced with the BV value that was just used, but the second BV predictor candidate $BV_{cand1}$ is unchanged. At the encoder side, for a current block, the encoder selects one of $BV_{cand0}$ and $BV_{cand1}$ to use as BV predictor. The encoder signals a flag value that indicates which one of $BV_{cand0}$ and $BV_{cand1}$ has been used by the encoder and should be used by the decoder. A decoder receives and parses the flag value and, based on the flag value, selects one of $BV_{cand0}$ and $BV_{cand1}$ to use as the BV predictor for the block. In this approach, the encoder and the decoder each store two BV predictor candidates $BV_{cand0}$ and $BV_{cand1}$, and the first BV predictor candidate $BV_{cand0}$ is updated during encoding or decoding.

In another approach, BV predictor candidates are assembled from among actual BV values of previously coded blocks that neighbor the current block in a picture. The encoder and decoder determine up to x actual BV values of neighboring blocks. The neighboring blocks are previously coded intra-BC-predicted blocks in the picture to the left of the current block, above the current block, to the above-right of the current block, and so on. The value of x depends on implementation and can be, for example, 2, 3, 4, 5 or some other number. If less than x neighboring blocks with actual BV values are available, the set of BV predictor candidates can include less than x BV predictor candidates.

FIG. 15 shows an example of this approach. In FIG. 15, three BV values (1531, 1541, 1551) of three neighboring intra-BC-predicted blocks (1530, 1540, 1550) provide the BV predictor candidates for merge mode for the BV predictor of a current block (1560) of a current frame (1510). If one of the neighboring blocks is unavailable (e.g., not an intra-BC-predicted block, or outside the picture, tile or slice), in some cases another neighboring block can be added (e.g., block to the above-left of the current block). As shown in FIG. 15, the set of BV predictor candidates can include one or more default BV predictors (such as a default BV predictor (BVx, 0) with horizontal displacement and a default BV predictor (0, BVy) with vertical displacement). In FIG. 15, index values idx 0 . . . idx 4 are assigned to the BV predictor candidates with BV values (1541, 1531, 1551) and default BV predictors according to expected likelihood of selection.

The treatment of redundant values among the BV predictor candidates depends on implementation. In some implementations, a set of BV predictor candidates for merge mode can include redundant values—that is, redundant BV predictor candidates are not removed or replaced. In other implementations, when assembling a set of BV predictor candidates for merge mode, an encoder and decoder do not add a redundant BV predictor value to the set. This approach can result in a smaller set of BV predictor candidates, which can reduce bitrate for coded index values. In still other implementations, when assembling a set of BV predictor candidates for merge mode, an encoder and decoder replace a BV predictor candidate that would be redundant to a BV predictor candidate already in the set with a different BV predictor candidate (e.g., from another previously coded intra-BC-predicted block, from another neighboring intra-BC-predicted block, from another default BV predictor option). For example, if the BV value of the $3^{rd}$ previous intra-BC-predicted block is the same as the BV value of the $1^{st}$ previous intra-BC-predicted block or $2^{nd}$ previous intra-BC-predicted block, the encoder/decoder instead adds the BV value of the $4^{th}$ previous intra-BC-predicted block to the set of BV predictor candidates. If that BV value would be redundant, the encoder/decoder instead adds the BV value of the $5^{th}$, $6^{th}$, etc. previous intra-BC-predicted block. Or, the encoder/decoder adds another default BV predictor.

2. Example Encoding With Selected BV Predictors

Figure 16A:
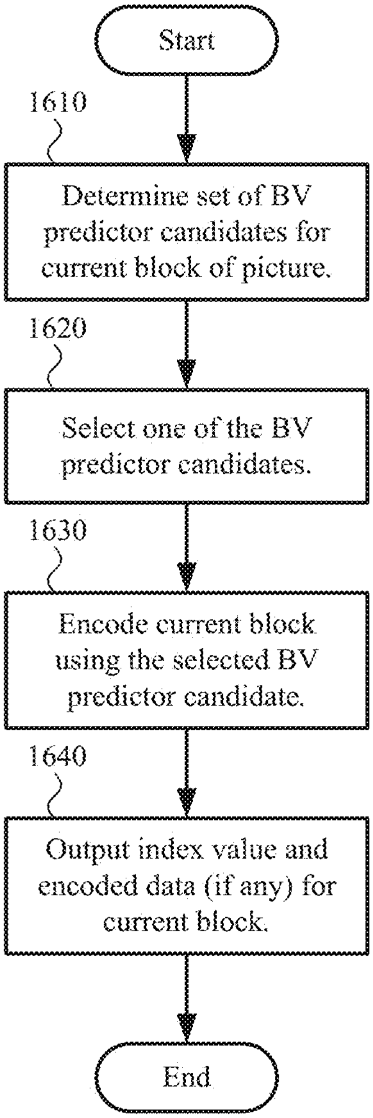
FIGS. 16*a* and 16*b* are flowcharts illustrating techniques for encoding that includes selection among multiple BV predictor candidates.

FIG. 16*a* shows a generalized technique (1600) for encoding that includes merge mode for BV predictors. An image encoder or video encoder such as one described with reference to FIG. 3 or FIGS. 5*a*-5*b* can perform the technique (1600).

To start, the encoder determines (1610) a set of multiple BV predictor candidates for a current intra-BC-predicted block of a picture. The current block is, for example, a part of a CU of a CTU. The encoder can determine the set of BV predictor candidates using one of the approaches described with reference to FIGS. 14 and 15, or using another approach. In general, the BV predictor candidates can include up to x actual BV values of previous blocks, respectively, where x depends on implementation (e.g., x is 2, 3, 4, 5, or some other number). The x previous blocks can be identified based at least in part on location in a neighborhood around the current block (see, e.g., FIG. 15) and/or decoding order compared to the current block (see, e.g., FIG. 14). The BV predictor candidates can also include one or more default BV predictors (e.g., each having a BV predictor component with a non-zero value).

The encoder selects (1620) one of the multiple BV predictor candidates to use for the current intra-BC-predicted block. For example, when the current block will be encoded using intra BC prediction with the selected BV predictor candidate, the encoder selects the BV predictor candidate for which the referenced intra-prediction region most closely matches the current block by some metric (e.g., sum of absolute difference, mean squared error). Or, when the current block has a BV value (identified through BV estimation) that will be used for intra BC prediction, the encoder selects the BV predictor candidate that most closely matches the BV value for the current block. This selection results in the smallest BV differential, which tends to improve the efficiency of entropy coding.

Figure 16B:
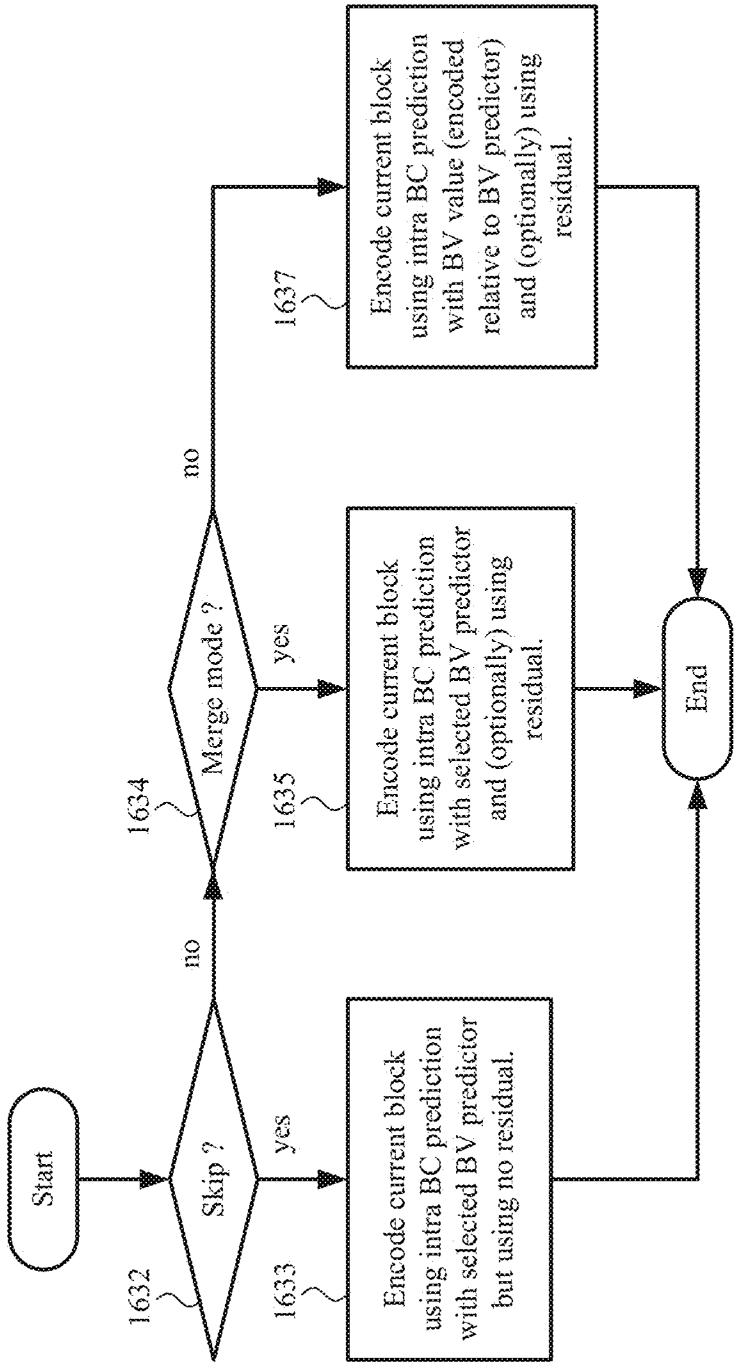

The encoder encodes (1630) the current intra-BC-predicted block using the selected BV predictor candidate. FIG. 16*b* shows details of the encoding (1630) of the current block in example implementations. The encoder checks (1632) whether the current block is encoded in skip mode. If so, the encoder encodes (1633) the current block using intra BC prediction with the selected BV predictor but not using any residual data. Otherwise (not skip mode), the encoder checks (1634) whether the current block is encoded in merge mode. If so, the encoder encodes (1635) the current block using intra BC prediction with the selected BV predictor. In merge mode, the encoder optionally encodes residual data for the current block. Otherwise (not merge mode), the encoder encodes (1637) the current block using intra BC prediction with the BV value for the current block, optionally encoding residual data for the current block.

The encoder outputs (1640) in a bitstream an index value that indicates the selected BV predictor candidate. When the set of BV predictor candidates includes two BV predictor candidates, the index value can be a flag value. Or, when there are more than two BV predictor candidates, the index value can be an integer value. The index value can be entropy coded or signaled as a fixed-length value. The index value can be (conditionally) signaled in the bitstream as a separate syntax element if an intra BC prediction mode syntax element indicates the current block is encoded using intra BC prediction mode. Or, the index value can be signaled in the bitstream jointly with another syntax element (e.g., a syntax element that indicates whether the current block is encoded using intra BC prediction mode).

The encoder also outputs any encoded data for the current block. A value in the bitstream can indicate whether the current block is encoded in skip mode. If the current block is a skip-mode block, the bitstream lacks a BV differential for the current block and lacks residual data for the current block. If the current block is a merge-mode block, the bitstream lacks a BV differential for the current block but may include residual data for the current block. Otherwise (current block is a non-skip-mode, non-merge-mode block), the bitstream includes a BV differential for the current block (indicating a difference between the selected BV predictor candidate and BV value for the current block) and may also include residual data for the current block.

When the encoder uses a data structure to track the actual BV values used for previous intra-BC-predicted blocks, the encoder can update the data structure with the BV value for the current block.

3. Example Decoding With Selected BV Predictors

Figure 17A:
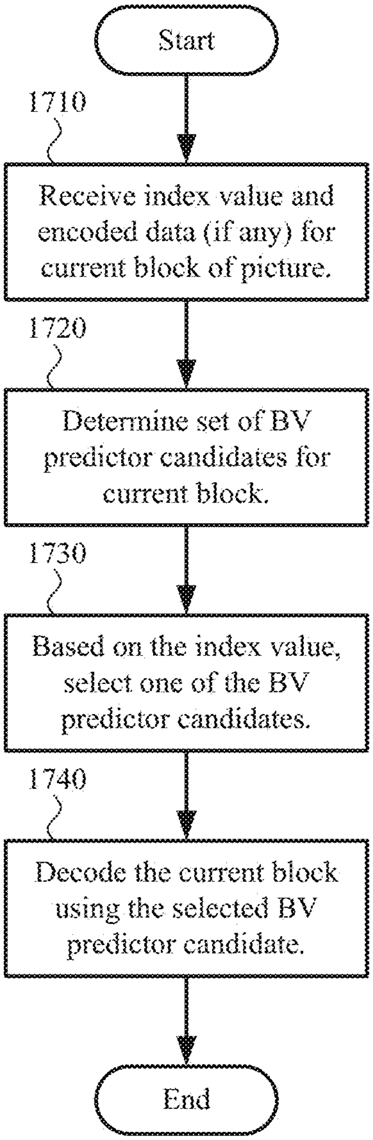
FIGS. 17*a* and 17*b* are flowcharts illustrating techniques for decoding that includes selection among multiple BV predictor candidates.

FIG. 17*a* shows a generalized technique (1700) for decoding that includes merge mode for BV predictors. An image decoder or video decoder such as one described with reference to FIG. 4 or FIG. 6 can perform the technique (1700).

To start, the decoder receives (1710) from a bitstream an index value for a current block of a picture. The current block is, for example, a part of a CU of a CTU. The index value indicates a selected BV predictor candidate from among a set of multiple BV predictor candidates. When the set of BV predictor candidates includes two BV predictor candidates, the index value can be a flag value. Or, when there are more than two BV predictor candidates, the index value can be an integer value. The index value can be entropy coded, in which case the decoder entropy decodes the index value, or signaled as a fixed-length value. The index value can be (conditionally) signaled in the bitstream as a separate syntax element if an intra BC prediction mode syntax element indicates the current block has been encoded using intra BC prediction mode. Or, the index value can be signaled in the bitstream jointly with another syntax element (e.g., a syntax element that indicates whether the current block is encoded using intra BC prediction mode).

The decoder also receives any encoded data for the current block. The decoder entropy decodes the encoded data at the appropriate stage of decoding. A value in the bitstream can indicate whether the current block has been encoded in skip mode. If the current block is a skip-mode block, the bitstream lacks a BV differential for the current block and lacks residual data for the current block. If the current block is a merge-mode block, the bitstream lacks a BV differential for the current block but may include residual data for the current block. Otherwise (current block is a non-skip-mode, non-merge-mode block), the bitstream includes a BV differential for the current block and may also include residual data for the current block.

The decoder determines (1720) the set of multiple BV predictor candidates for the current block. The decoder can determine the set of BV predictor candidates using one of the approaches described with reference to FIGS. 14 and 15, or using another approach. In general, the BV predictor candidates can include up to x actual BV values of previous blocks, where x depends on implementation (e.g., x is 2, 3, 4, 5, or some other number). The x previous blocks can be identified based at least in part on location in a neighborhood around the current block (see, e.g., FIG. 15) and/or decoding order compared to the current block (see, e.g., FIG. 14). The BV predictor candidates can also include one or more default BV predictors (e.g., each having a BV predictor component with a non-zero value).

Figure 17B:
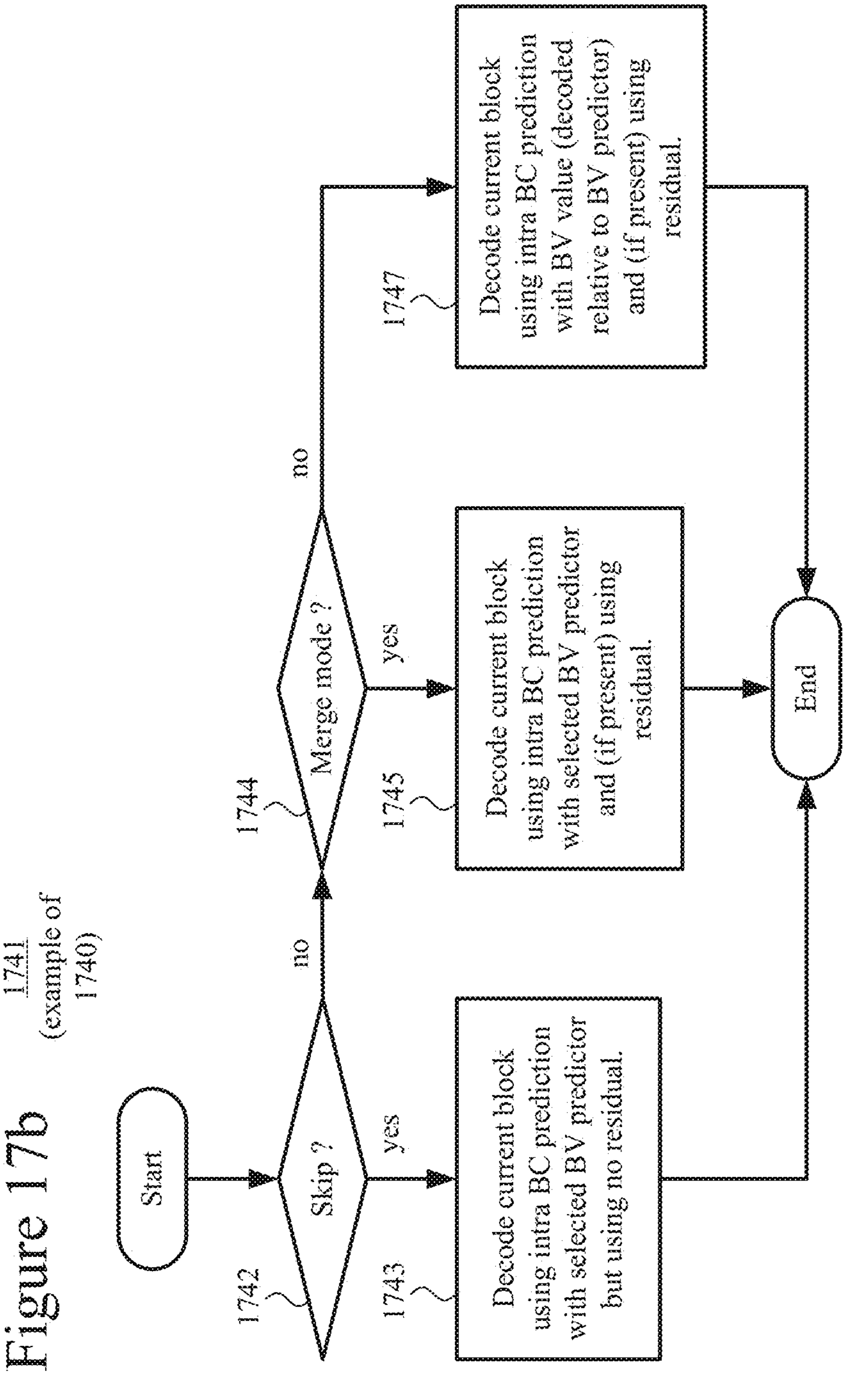

Based on the index value, the decoder selects (1730) one of the multiple BV predictor candidates to use for the current block. The decoder decodes (1740) the current block using the selected BV predictor candidate. FIG. 17*b* shows details of the decoding (1740) of the current block in example implementations. The decoder checks (1742) whether the current block has been encoded in skip mode. If so, the decoder decodes (1743) the current block using intra BC prediction with the selected BV predictor but not using any residual data. Otherwise (not skip mode), the decoder checks (1744) whether the current block has been encoded in merge mode. If so, the decoder decodes (1745) the current block using intra BC prediction with the selected BV predictor. In merge mode, the decoder decodes residual data (if present) for the current block. Otherwise (not merge mode), the decoder decodes (1747) the current block using intra BC prediction with the BV value for the current block (decoded with a BV differential relative to the selected BV predictor), also decoding residual data (if present) for the current block.

When the decoder uses a data structure to track the actual BV values used for previous intra-BC-predicted blocks, the decoder can update the data structure with the BV value for the current block.

4. Example Implementations of Merge Mode

In HEVC implementations, the syntax and semantics for CUs can be modified to signal syntax elements for merge mode for BV prediction and/or skip mode for intra-BC-predicted blocks.

In the draft HEVC specification in JCTVC-O1005_v3, cu_skip_flag[x0][y0] indicates whether a current CU is skipped, but the flag is signaled only if the current slice is a predictive ("P") slice or bi-predictive ("B") slice. The array indices x0, y0 specify the location (x0, y0) of the top-left luma sample of the considered CB relative to the top-left luma sample of the picture. If cu_skip_flag[x0][y0] is 1, the current CU is skipped, and no more syntax elements are parsed after cu_skip_flag[x0][y0] for the CU, except for the merging candidate index merge_idx[x0][y0]. If cu_skip_flag[x0][y0] is 0, the CU is not skipped. When cu_skip_flag [x0][y0] is not present, it is inferred to be 0.

According to one possible modification, cu_skip_flag[x0] [y0] is also signaled if the current slice is an intra ("I") slice. When intra BC prediction is enabled (according to the flag intra_block_copy_enabled_flag in the sequence parameter set), if the value of cu_skip_flag[x0][y0] is 1, the current CU is skipped, and no more syntax elements are parsed after cu_skip_flag[x0][y0] for the CU, except the BV predictor index value idx. In particular, no BV difference is signaled for the current, skipped CU. On the other hand, if the value of cu_skip_flag[x0][y0] is 0, the current CU is not skipped.

In the draft HEVC specification in JCTVC-O1005_v3, intra_bc_flag[x0][y0] indicates whether a current CU is coded in intra BC prediction mode. The array indices x0, y0 specify the location (x0, y0) of the top-left luma sample of the considered CB relative to the top-left luma sample of the picture. If intra_bc_flag[x0] y0] is 1, the current CU is coded in intra BC prediction mode. If intra_bc_flag[x0][y0] is 0, the current CU is coded with intra spatial prediction. When not present, the value of intra_bc_flag is inferred to be 0.

According to one possible modification for intra_bc_flag [x0][y0], when intra_bc_flag[x0][y0] is 1, syntax for the current CU includes a BV predictor index value idx that indicates a selection of BV predictor candidate. The index value idx can be a flag value, to indicate a selection between two BV predictor candidates, or an integer value, to indicate a selection among more than two BV predictor candidates. The index value can be entropy coded using, for example, arithmetic coding.

Or, according to another possible modification for intra_bc_flag[x0][y0], the syntax element is an integer value instead of a binary flag. If intra_bc_flag[x0][y0] is 0, the current CU is coded with intra spatial prediction, as in JCTVC-O1005_v3. On the other hand, if intra_bc_flag[x0] [y0] is greater than 0, then the current CU is coded in intra BC prediction mode, and intra_bc_flag[x0][y0] also indicates the BV predictor index value idx. For example, if intra_bc_flag[x0][y0] is 1, then idx is 1; if intra_bc_flag[x0] [y0] is 2, then idx is 2; and so on. In other words, the BV predictor index value idx is jointly coded with the binary value for spatial or BC prediction in a single syntax element.

For either way of modifying intra_bc_flag[x0][y0] and signaling the index value idx, the variable BvIntraPredictor [idx][compIdx] specifies the BV predictor candidate to be used for intra BC prediction of the current CU. For example, in the example of FIG. 14, BvIntraPredictor[0][compIdx], BvIntraPredictor[1][compIdx] and BvIntraPredictor[2] [compIdx] store the BV values of up to three of the most recent previous intra-BC-predicted blocks. Or, in the example of FIG. 15, BvIntraPredictor[0][compIdx], BvIntraPredictor[1][compIdx] and BvIntraPredictor[2][compIdx] store the BV values of up to three neighboring intra-BC-predicted blocks. BvIntraPredictor[3][compIdx] and BvIntraPredictor[4][compIdx] store the default BV predictors in the horizontal and vertical directions, respectively. The horizontal BV component is assigned compIdx=0, and the vertical BV component is assigned compIdx=1.

For a skip-mode block or merge-mode block, no BV differential is signaled for the block. The BV value for the block is the selected BV predictor candidate.

For a non-skip-mode, non-merge-mode block, the BV differential is signaled in the bitstream. The variable BvdIntra[x0][y0][compIdx] specifies the BV differential. The array indices x0, y0 specify the location (x0, y0) of the top-left luma sample of the considered PB relative to the top-left luma sample of the picture. The horizontal BV differential component is assigned compIdx=0, and the vertical BV differential component is assigned compIdx=1. The BV value for the block is BvIntra[x0][y0][compIdx]= BvdIntra[x0][y0][compIdx]+BvIntraPredictor[idx][compIdx], for compIdx=0 . . . 1.

The variable BvIntraPredictor[idx][compIdx] can then be updated to include the BV value for the current CU.

5. Alternatives and Variations

When a current block has a BV value that is identified through BV estimation, the encoder can use any form of BV estimation to identify the BV value for the current block. During the BV estimation for the current block, the encoder can start by evaluating one or more BV predictor candidates that are available for the current block. Starting BV estimation with BV predictor candidate(s) can help quickly identify a suitable BV value, avoiding evaluation of other BV values. The encoder evaluates other BV values as needed. The encoder can use a data structure to track BV predictor candidates. When a BV value can be applied for different sizes of blocks (e.g., for a 32×32 CU, 16×16 CU, 8×8 CU or smaller TU or CU), the data structure can include different BV predictor candidates for the different sizes of blocks (e.g., one or more BV predictor candidates for a 32×32 CU, one or more BV predictor candidates for a 16×16 CU, and so on). For the current block, the encoder first evaluates the BV predictor candidate(s) stored in the data structure for the level (size) of the current block, then proceeds with evaluation of other BV values if needed.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more non-transitory computer-readable media having stored thereon computer-executable instructions for causing a computer system that implements a video encoder, when programmed thereby, to perform operations comprising:

encoding a picture, thereby producing encoded data for the picture, wherein the encoding the picture includes:

determining a set of multiple block vector ("BV") predictor candidates for a current block of the picture, the current block being compressed with intra-picture coding in merge mode, the set of multiple BV predictor candidates including one or more actual BV values of previous blocks in a neighborhood around the current block, wherein the determining the set of multiple BV predictor candidates for the current block includes:

determining that a given BV predictor candidate is redundant with one of the set of multiple BV predictor candidates for the current block; and replacing the given BV predictor candidate with another BV predictor candidate of the set of multiple BV predictor candidates for the current block;

selecting one of the multiple BV predictor candidates to use for the current block;

encoding the current block using intra block copy prediction with the selected BV predictor candidate, wherein the selected BV predictor candidate indicates a displacement to a region within the picture; and outputting, as part of a bitstream, the encoded data, wherein the encoded data includes a merge mode index value that indicates the selected BV predictor candidate, and wherein the encoded data further includes one or more syntax elements indicating that the current block has been compressed with intra-picture coding in merge mode.

2. The one or more computer-readable media of claim 1, wherein the bitstream lacks a BV differential for the current block.

3. The one or more computer-readable media of claim 1, wherein the bitstream lacks residual data for the current block.

4. The one or more computer-readable media of claim 1, wherein the merge mode index value is a flag value, the set of multiple BV predictor candidates having two BV predictor candidates.

5. The one or more computer-readable media of claim 1, wherein the merge mode index value is an integer value, the set of multiple BV predictor candidates having more than two BV predictor candidates.

6. The one or more computer-readable media of claim 1, wherein the multiple BV predictor candidates include up to x actual BV values of the previous blocks, wherein x is at least 2, and wherein the previous blocks are identified based at least in part on location in the neighborhood around the current block.

7. The one or more computer-readable media of claim 1, wherein the one or more syntax elements indicating that the current block has been compressed with intra-picture coding in merge mode include an indication that the current block is encoded in merge mode.

8. The one or more computer-readable media of claim 1, wherein the determining the set of multiple BV predictor candidates includes assembling the set of multiple BV predictor candidates so as to prevent redundancy of any BV predictor candidate included in the set of multiple BV predictor candidates.

9. In a computer system comprising one or more processing units and memory, a method comprising:

receiving encoded data in a bitstream, the encoded data including a merge mode index value for a current block of a picture, the encoded data further including one or more syntax elements indicating that the current block has been compressed with intra-picture coding in merge mode; and storing the encoded data, the encoded data being usable to cause a video decoder, when processing the encoded data, to perform decoding operations comprising:

determining a set of multiple block vector ("BV") predictor candidates for the current block, the set of multiple BV predictor candidates including one or more actual BV values of previous blocks in a neighborhood around the current block, wherein the determining the set of multiple BV predictor candidates for the current block includes:

determining that a given BV predictor candidate is redundant with one of the set of multiple BV predictor candidates for the current block; and replacing the given BV predictor candidate with another BV predictor candidate of the set of multiple BV predictor candidates for the current block;

based on the merge mode index value, selecting one of the multiple BV predictor candidates to use for the current block; and based on the one or more syntax elements indicating that the current block has been compressed with intra-picture coding in merge mode, decoding the current block using intra block copy prediction with the selected BV predictor candidate, wherein the selected BV predictor candidate indicates a displacement to a region within the picture.

10. The method of claim 9, wherein the merge mode index value is a flag value, the set of multiple BV predictor candidates having two BV predictor candidates.

11. The method of claim 9, wherein the merge mode index value is an integer value, the set of multiple BV predictor candidates having more than two BV predictor candidates.

12. The method of claim 9, wherein the one or more syntax elements include an indication that the current block is encoded in merge mode, and wherein the decoding operations further comprise:

based at least in part on the indication that the current block is encoded in merge mode, determining that the current block is encoded in merge mode.

13. One or more non-transitory computer-readable media having stored thereon computer-executable instructions for causing a computer system that implements a video decoder, when programmed thereby, to perform operations comprising:

receiving encoded data in a bitstream, the encoded data including a merge mode index value for a current block of a picture, the encoded data further including one or more syntax elements indicating that the current block has been compressed with intra-picture coding in merge mode; and decoding the encoded data to reconstruct a picture, including:

determining a set of multiple block vector ("BV") predictor candidates for the current block, the set of multiple BV predictor candidates including one or more actual BV values of previous blocks in a neighborhood around the current block, wherein the determining the set of multiple BV predictor candidates for the current block includes:

determining that a given BV predictor candidate is redundant with one of the set of multiple BV predictor candidates for the current block; and replacing the given BV predictor candidate with another BV predictor candidate of the set of multiple BV predictor candidates for the current block;

based on the merge mode index value, selecting one of the multiple BV predictor candidates to use for the current block; and based on the one or more syntax elements indicating that the current block has been compressed with intra-picture coding in merge mode, decoding the current block using intra block copy prediction with the selected BV predictor candidate, wherein the selected BV predictor candidate indicates a displacement to a region within the picture.

14. The one or more computer-readable media of claim 13, wherein the bitstream lacks a BV differential for the current block.

15. The one or more computer-readable media of claim 13, wherein the bitstream lacks residual data for the current block.

16. The one or more computer-readable media of claim 13, wherein the merge mode index value is a flag value, the set of multiple BV predictor candidates having two BV predictor candidates.

17. The one or more computer-readable media of claim 13, wherein the merge mode index value is an integer value, the set of multiple BV predictor candidates having more than two BV predictor candidates.

18. The one or more computer-readable media of claim 13, wherein the multiple BV predictor candidates include up to x actual BV values of the previous blocks, wherein x is at least 2, and wherein the previous blocks are identified based at least in part on location in the neighborhood around the current block.

19. The one or more computer-readable media of claim 13, wherein the one or more syntax elements include an indication that the current block is encoded in merge mode, the operations further comprising:

based at least in part on the indication, determining that the current block is encoded in merge mode.

20. The one or more computer-readable media of claim 13, wherein the determining the set of multiple BV predictor candidates includes assembling the set of multiple BV predictor candidates so as to prevent redundancy of any BV predictor candidate included in the set of multiple BV predictor candidates.

* * * * *